United States Patent
Fujita et al.

(10) Patent No.: US 7,762,379 B2
(45) Date of Patent: Jul. 27, 2010

(54) FLOATING TYPE DISK BRAKE

(75) Inventors: Nobuhiro Fujita, Shizuoka (JP);
Katsunori Muramatsu, Shizuoka (JP);
Hidekazu Kawai, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 502 days.

(21) Appl. No.: 11/596,922

(22) PCT Filed: May 18, 2005

(86) PCT No.: PCT/JP2005/009057
§ 371 (c)(1),
(2), (4) Date: Nov. 20, 2007

(87) PCT Pub. No.: WO2005/111457
PCT Pub. Date: Nov. 24, 2005

(65) Prior Publication Data
US 2008/0264741 A1    Oct. 30, 2008

(30) Foreign Application Priority Data
May 18, 2004   (JP) .............................. 2004-147177
Dec. 2, 2004   (JP) .............................. 2004-350365

(51) Int. Cl.
*F16D 65/12*   (2006.01)
(52) U.S. Cl. .............................. 188/218 XL; 188/264 A
(58) Field of Classification Search .............. 188/18 A, 188/218 XL, 218 A, 264 AA, 71.6, 26, 264 A, 188/58, 59
See application file for complete search history.

(56) References Cited

U.S. PATENT DOCUMENTS 4,821,848 A    4/1989   Izumine (Continued)

FOREIGN PATENT DOCUMENTS

EP    959261 A2 *   11/1999

(Continued)

OTHER PUBLICATIONS

Communication from European Patent Office for application No. 05741528.3 dated Oct. 5, 2007.

(Continued)

*Primary Examiner*—Melanie Torres Williams
(74) *Attorney, Agent, or Firm*—Cermak Nakajima LLP; Tomoko Nakajima

(57) ABSTRACT

A floating type disc brake "A" used for a vehicle such as a motorcycle comprising a braking rotor 1A and a hub 2A arranged inside the braking rotor 1A, the braking rotor 1A including an annular rotor portion 11 and a plurality of projections 13A extending radially inward from the inner circumferential portion of the rotor portion 11, and further comprising a connecting means 3 for connecting the braking rotor 1A and the hub 2A at positions in which the projections 13A of the braking rotor 1A are abutted to the outer circumferential portion of the hub 2A. At least one of the rotor portion 11 and the projections 13A is formed with cutout portions 13b at the boundary region between the rotor portion 11 and the projections 13A. It is possible to suppress a local heat dissipation in regions of the rotor portion 11 in which the projections 13A are formed and thus to reduce irregularity of heat distribution in the rotor portion 11 during braking operations.

17 Claims, 22 Drawing Sheets

U.S. PATENT DOCUMENTS

| | | | | |
|---|---|---|---|---|
| 6,957,726 B2 * | 10/2005 | Gehrs | ................... | 188/218 XL |
| 2004/0520543 | 1/2004 | Tironi et al. | | |

FOREIGN PATENT DOCUMENTS

| | | |
|---|---|---|
| EP | 1016803 A2 | 7/2000 |
| JP | 57-046141 U | 3/1982 |
| JP | 63-259227 A | 10/1988 |
| JP | 64-046539 U | 3/1989 |
| JP | H01-46539 U | 12/1990 |
| JP | 08-121513 A | 5/1996 |
| JP | 2002-227891 A | 8/2002 |
| JP | 2002-303342 A | 10/2002 |
| JP | 2004-169738 A | 6/2004 |
| JP | 2004-316829 A | 11/2004 |
| WO | WO 02/046639 A | 6/2002 |
| WO | WO 02/46639 A1 | 6/2002 |
| WO | WO 03/064882 A1 | 8/2003 |

OTHER PUBLICATIONS

Office Action from Chinese Patent Office for application No. 200580015484.6 dated Dec. 28, 2007.

* cited by examiner (a)

(b)

(a)

(b)

LEGEND  P:POINT, T:TEMPERATURE SCALE, R:RAINBOW, A:ANIMATION,
F:FULL, L:LOCKED, I:INVERTED, UL:UPPER LIMIT, LL:LOWER LIMIT,
IU:ISOTHERM UPPER LIMIT, IL:ISOTHERM LOWER LIMIT

LEGEND  P:POINT, T:TEMPERATURE SCALE, R:RAINBOW, A:ANIMATION, F:FULL, L:LOCKED, I:INVERTED, UL:UPPER LIMIT, LL:LOWER LIMIT, IU:ISOTHERM UPPER LIMIT, IL:ISOTHERM LOWER LIMIT (a)

LEGEND

P:POINT, T:TEMPERATURE SCALE, R:RAINBOW, A:ANIMATION, F:FULL, L:LOCKED, I:INVERTED, UL:UPPER LIMIT, LL:LOWER LIMIT, IU:ISOTHERM UPPER LIMIT, IL:ISOTHERM LOWER LIMIT (b)

Radial position from outer circumferential edge to radially inward side of rotor portion (mm)

(a)

LEGEND

P:POINT, T:TEMPERATURE SCALE, R:RAINBOW, A:ANIMATION,
F:FULL, L:LOCKED, I:INVERTED, UL:UPPER LIMIT, LL:LOWER LIMIT,
IU:ISOTHERM UPPER LIMIT, IL:ISOTHERM LOWER LIMIT (b)

Radial position from outer circumferential edge
to radially inward side of rotor portion (mm)

(a)

LEGEND
T:TEMPERATURE SCALE, R:RAINBOW (b)

Radial position from outer circumferential edge
to radially inward side of rotor portion (mm)

FLOATING TYPE DISK BRAKE

BACKGROUND OF THE INVENTION

1. Field of the Invention

The present invention relates to a floating type disc brake used for a vehicle such as a motorcycle.

2. Description of Background Art

In such a floating type disc brake, the thermal expansion caused in a braking rotor by heat generation in the braking rotor during braking operation is adapted to be absorbed by a predetermined gap formed by arranging and connecting the braking rotor and a hub via the gap and thus problems such as deformation of the braking rotor caused by the thermal expansion can be solved. However there is a further problem that the braking rotor itself is liable to be heated to a high temperature since the heat caused in the braking rotor during braking operation is difficult to be conducted to the hub.

There has been provided, e.g. in a first prior art, a floating type disc brake in which the braking rotor comprises an annular rotor portion and a plurality of projections extending radially inward from the inner circumferential portion of the rotor portion, and the rotor portion and the hub arranged inside the annular braking rotor are connected by connecting means in a floating manner each other with the projections being abutted to the outer circumferential portion of the hub and heat transferring members being arranged between the projections of the braking rotor and the hub (see e.g. Claims of Japanese Laid-open Patent Publication No. 303342/2002).

In such a floating type disc brake, it has been required to have a necessary strength and to reduce its weight as light as possible in order to improve the fuel consumption of a vehicle equipped with the disc brake. There has been also provided, e.g. in a second prior art, a floating type disc brake in which either the braking rotor and the hub are formed with a plurality of through apertures over whole surfaces of them and the outer circumferential portion of the hub is additionally formed with through apertures so that beam-like portions each having a circular arc configuration are remained therealong. (see e.g. FIG. 1 of Japanese Laid-open Patent Publication No. 227891/2002).

DISCLOSURE OF THE INVENTION

Problems to be Solved by the Invention

However there is a problem in the first prior art that heat dissipation per unit time in regions of the projections of the braking rotor is locally facilitated since the heat caused in the rotor portion is positively dissipated from the projections to the hub via the heat transferring members.

In such a case it is afraid that heat deformation or heat deterioration would be caused in the rotor portion by a large temperature irregularity repeatedly caused by the braking operation. Such a phenomenon would be increased when the span between the adjacent projections is enlarged by reducing the number of pins or arms of the hub in order to reduce the weight of the disc brake.

Also there is a problem in the second prior art that the strength of the hub against torsional load applied thereto during braking operation is insufficient since each beam-like portion is formed as a circular arc configuration. If trying to provide a sufficient strength of the hub against the torsional load, for example, by increasing the thickness (i.e. cross sectional area) of the beam-like portion or reducing the area of the through aperture, it would be out of requirement of reducing the weight of the disc brake.

SUMMARY OF THE INVENTION

It is, therefore, a first object of the present invention to provide a floating type disc brake which has a sufficient strength against the heat deformation and heat deterioration of the rotor portion even though braking operations are repeatedly applied thereto. It is a second object of the present invention to provide a floating type disc brake which can satisfy requirements not only having a sufficient strength but having a light weight.

Means for Solving the Problems

For achieving the objects mentioned above, there is provided according to a first embodiment of the present invention of claim 1, a floating type disc brake comprising a braking rotor and a hub arranged inside the braking rotor, the braking rotor including an annular rotor portion and a plurality of projections extending radially inward from the inner circumferential portion of the rotor portion, and further comprising a connecting means for connecting the braking rotor and the hub at positions in which the projections of the braking rotor are abutted to the outer circumferential portion of the hub characterized in that at least one of the rotor portion and the projections is formed with cutout portions at the boundary region between the rotor portion and the projections.

According to the invention of claim 1, the heat generated in the rotor portion during braking operations can be transferred to the hub via the connecting means. The provision of the cutout portions formed in at least one of the rotor portion and the projections can reduce the contacting area between the rotor portion and the projections as well as the heat transferring area of the projections. Thus it is possible to suppress the heat dissipation per unit time from the rotor portion to the projections.

Accordingly it is possible to reduce the temperature irregularity in the rotor portion during braking operations as well as the heat deformation and heat deterioration in the rotor portion even though braking operations are repeated. In addition the provision of the cutout portions in the projections contributes to the reduction of weight of the disc brake.

In such a case it is possible to reduce the heat transfer area of each projection at the boundary region with the rotor portion by forming cutout portions symmetrically each other at either side of each projection.

It is also possible to reduce the contacting area between the rotor portion and each projection by forming the cutout portions at positions facing to the border of the projections and the rotor portion.

It is also possible to prevent for example generation of cracks in the projections by forming each cutout portion as having a configuration of a curved outline for avoiding concentration of stress.

It is further possible to reduce the heat transferring area of regions causing the heat dissipation from the rotor portion to projections and to uniform the heat distribution by forming in the rotor portion with openings at the boundary region between the rotor portion and the projections.

There is provided, according to a second embodiment of the present invention of claim 6, a floating type disc brake comprising a braking rotor and a hub arranged inside the braking rotor, the entire surface of the braking rotor in its axial direction being formed with a plurality of circular through apertures characterized in that the center of each through aperture is positioned on either one of a plurality of circles of a first group having its center on the rotational center of the braking rotor, and that centers of other two through apertures are positioned on one of a plurality of circles of a second group having a predetermined radius from the center of said through passage on one of the circles of the first group as well as positioned on the other one of the circles of the first group having a different radius from said circles of the first group.

According to the present invention of claim 6, it is possible to keep a sufficient strength of the braking rotor and to reduce the irregularity of heat distribution on surfaces of the braking rotor and thus to prevent generation of the heat deformation and heat deterioration in the braking rotor itself by providing the through apertures as defined in claim 6 although the braking force is repeatedly applied thereto by brake pads mounted on a caliper.

In this case it is possible to further reduce the irregularity of heat distribution on surfaces of the braking rotor as well as the weight of the braking rotor by forming substantially semi-circular cutouts on at least one of the inner and outer circumferential portions of the braking rotor.

If the edge portions of the through apertures are arranged so that they are positioned at or near mutually adjacent circles of the first group, it is possible to always maintain a good braking performance since whole surfaces of brake pads can be cleaned by edges of the through apertures.

It is preferable that the braking rotor comprises an annular rotor portion and a plurality of projections spaced apart each other and extending radially inward from the inner circumferential portion of the rotor portion, that the outer circumferential portion of the hub is formed with cutouts corresponding to the projections of the braking rotor, and that constricting means for preventing axial separation between the braking rotor and the hub are arranged at regions in which the projections are fitted in the cutouts when the hub is arranged inside the braking rotor. In this case although the heat generated during braking operation is transferred to the hub through the projections and the constricting means, the local heat dissipation at the connecting portions between the braking rotor and the hub can be prevented and thus the irregularity of the heat distribution on the rotor surfaces can be further reduced due to reduction of the size of connecting portions.

It is also preferable that cutout portions are symmetrically formed at both radially extending sides of each projection. This arrangement can suppress the heat dissipation from the rotor portion to the hub and thus reduce the irregularity of the heat distribution on the rotor surfaces and further contribute to reduction of the disc brake.

For keeping a sufficient strength of the braking rotor and suppressing the heat dissipation from the rotor portion to the projections, it is also preferable that the through apertures are formed in a projected region of the projections to the rotor portion at positions apart a distance larger than the thickness of the rotor portion from the boundary between the rotor portion and the projections.

It is also preferable that the through apertures of the braking rotor are arranged symmetrically with respect to a radial line passing through the center of one of projections and the center of rotation of the braking rotor.

There is further provided, according to a third embodiment of the present invention of claim 13, a floating type disc brake comprising a braking rotor and a hub arranged inside the braking rotor, a plurality of projections extending radially inward from the inner circumferential portion of the braking rotor, and further comprising a connecting means for connecting the braking rotor and the hub at positions in which the projections of the braking rotor are abutted to the outer circumferential portion of the hub characterized in that the hub has straight beam-like portions connecting circumferential portions of the hub abutted to the projections of the braking rotor, and that the longitudinal center line of each beam-like portion is positioned radially inside of an imaginary line connecting between the connecting means.

According to the arrangement of the present invention of claim 13, when the braking rotor rotating at a predetermined speed is braked by brake pads, the hub is loaded by a force acting to stop the braking rotor and a rotational force of the hub itself via connecting portions connected by the connecting means. In such a case the points through which the load is inputted to the hub reside in portions at which the connecting means and the outer circumferential portion of the hub are contacted each other (i.e. portions inside the imaginary line). Accordingly the input load can be received by the hub in a distributed manner through the beam-like portions which are arranged at either side of said points through which the load is inputted to the hub. Thus it is possible to increase the strength of hub even though the cross sectional area of the beam-like portion in the load input direction (i.e. the thickness of the beam-like portion) is small.

Especially for receiving a load in a torsional direction, it is preferable that the longitudinally middle point of each beam-like portion is positioned at radially outside a middle point of a radial line connecting the inner circumferential portion of the rotor portion and the outer circumferential portion of a central opening formed in the hub.

It is preferable that the hub is formed with linear arms extending radially outward from the central opening of the hub so that they are abutted to the projections of the braking rotor. In such an arrangement only a radial force, i.e. a compressive force or a tensional force is applied to each arm. The compressive force or tensional force can be received by the arm even though the thickness of the arm is small. Ability of reduction of the cross sectional area either of the beam-like portion and the arm enables to reduce a volume of the hub. Accordingly the arrangement of the present invention makes it possible to reduce the weight of the disc brake with maintaining its sufficient strength as compared with the disc brake of the prior art in which beam-like portions of circular arc configuration are arranged at the outer circumferential portion of the hub.

Effects of the Invention

As described above, the floating type disc brake of the present invention has effects that the heat deformation and heat deterioration are seldom caused in the rotor portion of the disc brake although repeating braking operations and that weight reduction can be attainable with keeping its sufficient strength.

BRIEF DESCRIPTION OF THE DRAWINGS

Additional advantages and features of the present invention will become apparent from the subsequent description and the appended claims, taken in conjunction with the accompanying drawings, wherein:

DESCRIPTION OF THE PREFERRED EMBODIMENTS

Best Modes for Carrying Out the Invention

Figure 1:
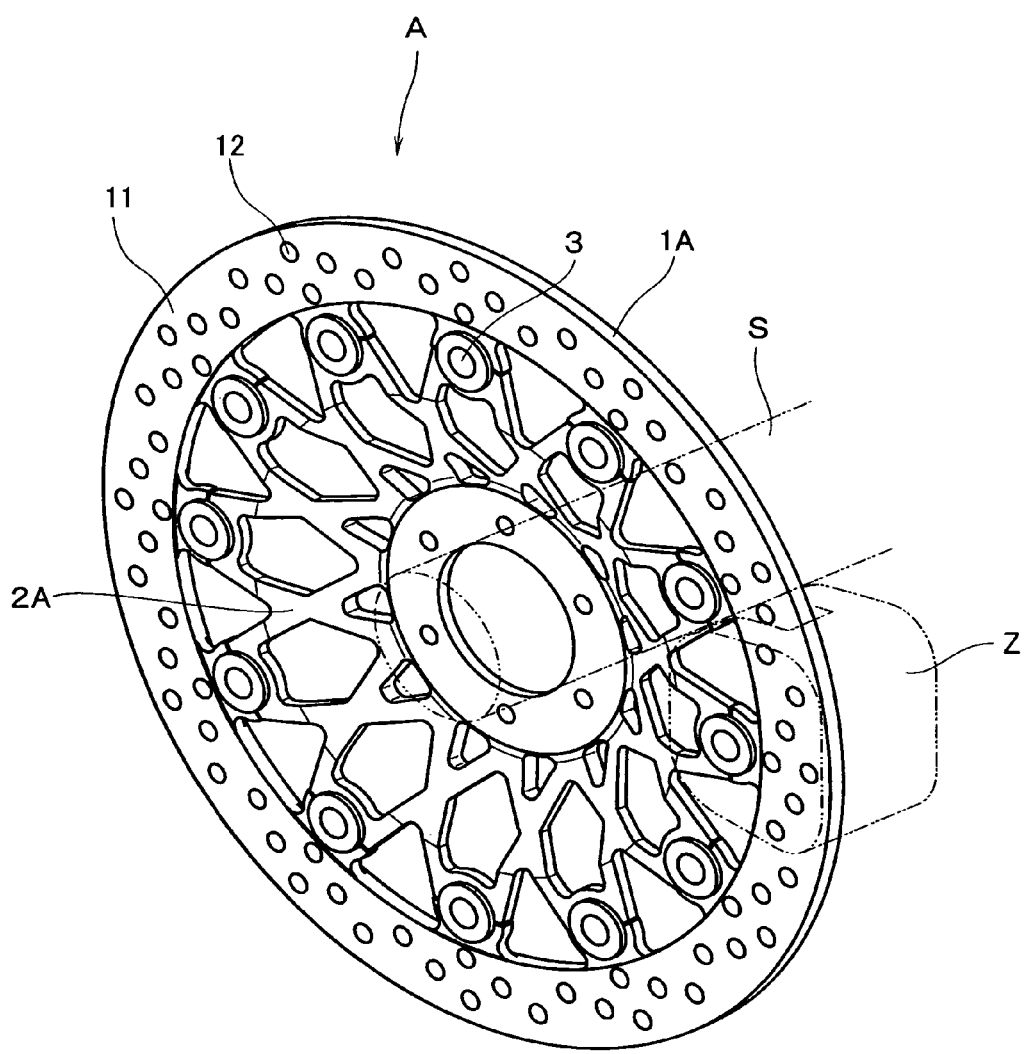
FIG. 1 is an explanatory perspective view of a floating type disc brake of a first embodiment of the present invention.

Referring to FIG. 1~FIG. 5, a reference character "A" denotes a floating type disc brake of a first embodiment of the present invention (FIG. 1 is a view taken from the front side of the floating type disc brake A). The floating type disc brake A comprises a braking rotor 1A and a hub 2A arranged inside the braking rotor 1A.

Figure 2:
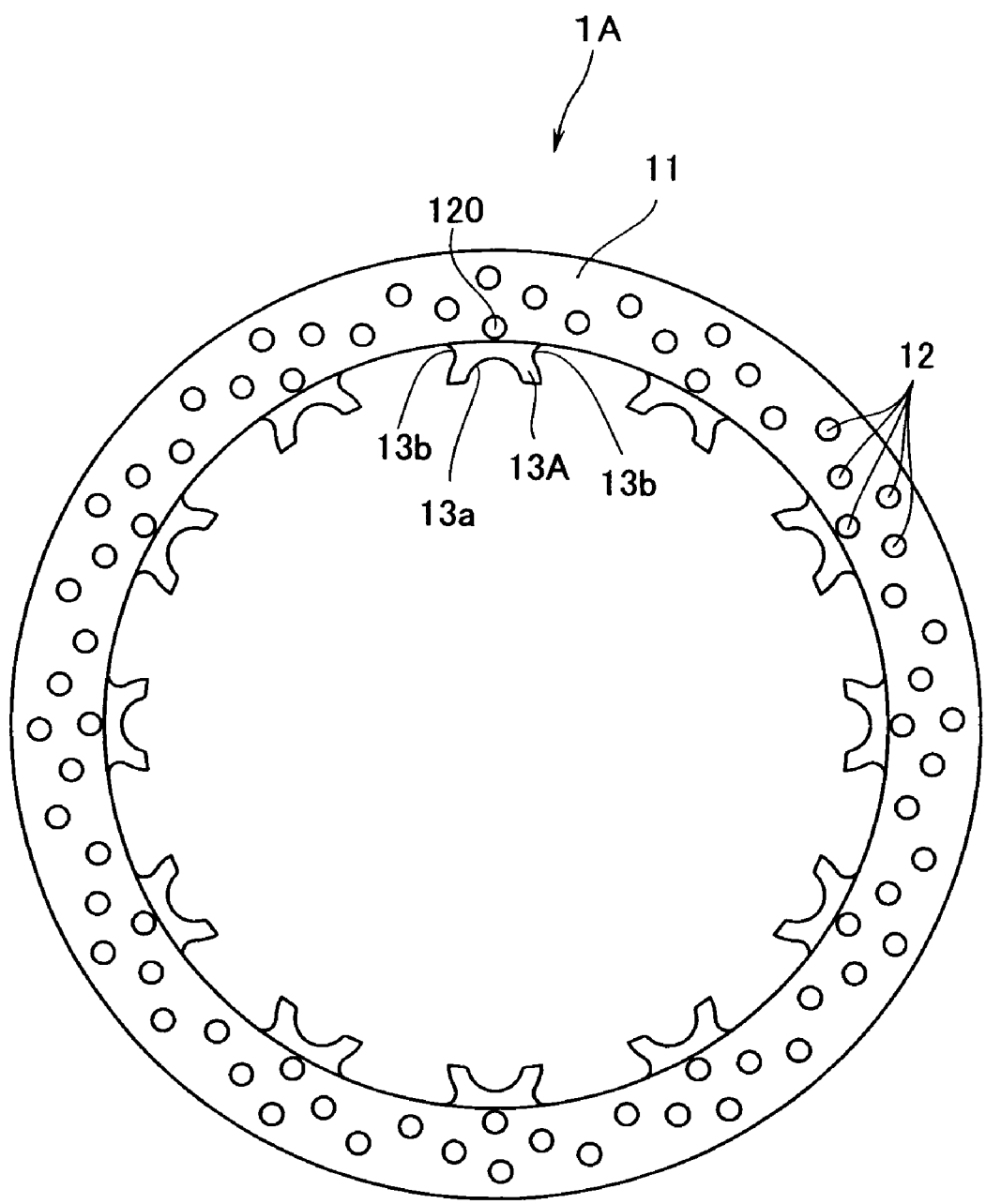
FIG. 2 is a front elevation view of a braking rotor of FIG. 1.

As shown in FIG. 2, the braking rotor 1A is made of metal having abrasion resistance such as stainless steel and has a rotor portion 11 formed as a flat annular plate. In order to improve the braking performance and to reduce the weight of the rotor portion 11, surfaces of the rotor portion 11 in an axial direction are formed with a plurality of circular through apertures 12 of a same diameter. The rotor portion 11 is adapted to be sandwiched by brake pads mounted on a caliper "Z" (FIG. 1) to yield a braking force.

Figure 3:
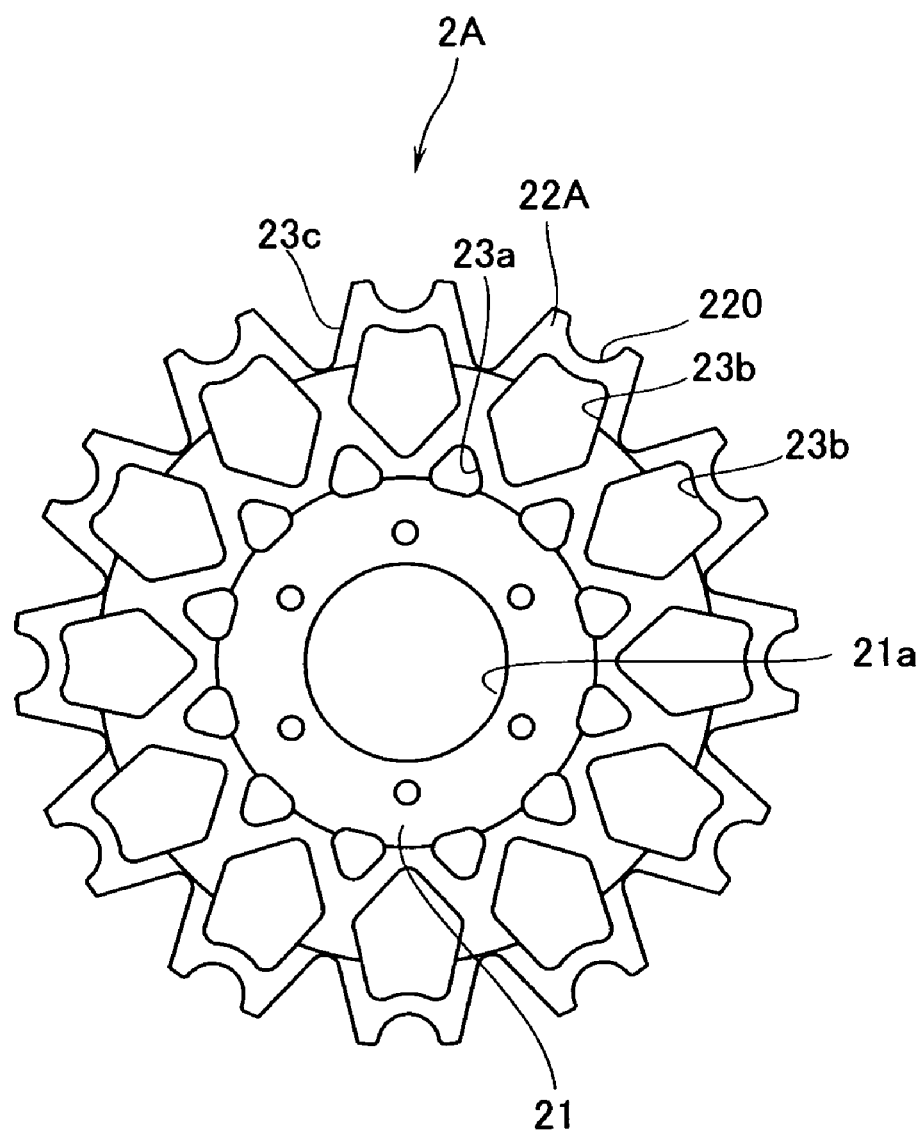
FIG. 3 is a front elevation view of a hub of FIG. 1.

As shown in FIG. 3, the hub 2A is made of metal material sustaining the braking load such as stainless steel and aluminum alloy etc. and comprises a circular flat base 21 having a central opening 21a and arms 22A extending radially outward from the base 21. The arms 22A are formed from a starting material of a disc shaped work formed with the base 21 by stamping the starting material to form 12 (twelve) through apertures 23a of substantially triangular configuration and 12 through apertures 23b of substantially pentagonal configuration respectively equidistantly on a same circle as well as 12 notches 23c of substantially equilateral triangular configuration so that cross members each having "X" configuration are continuously formed circumferentially around the base 21 to achieve the strength and weight reduction of the hub 2A.

Figure 4:
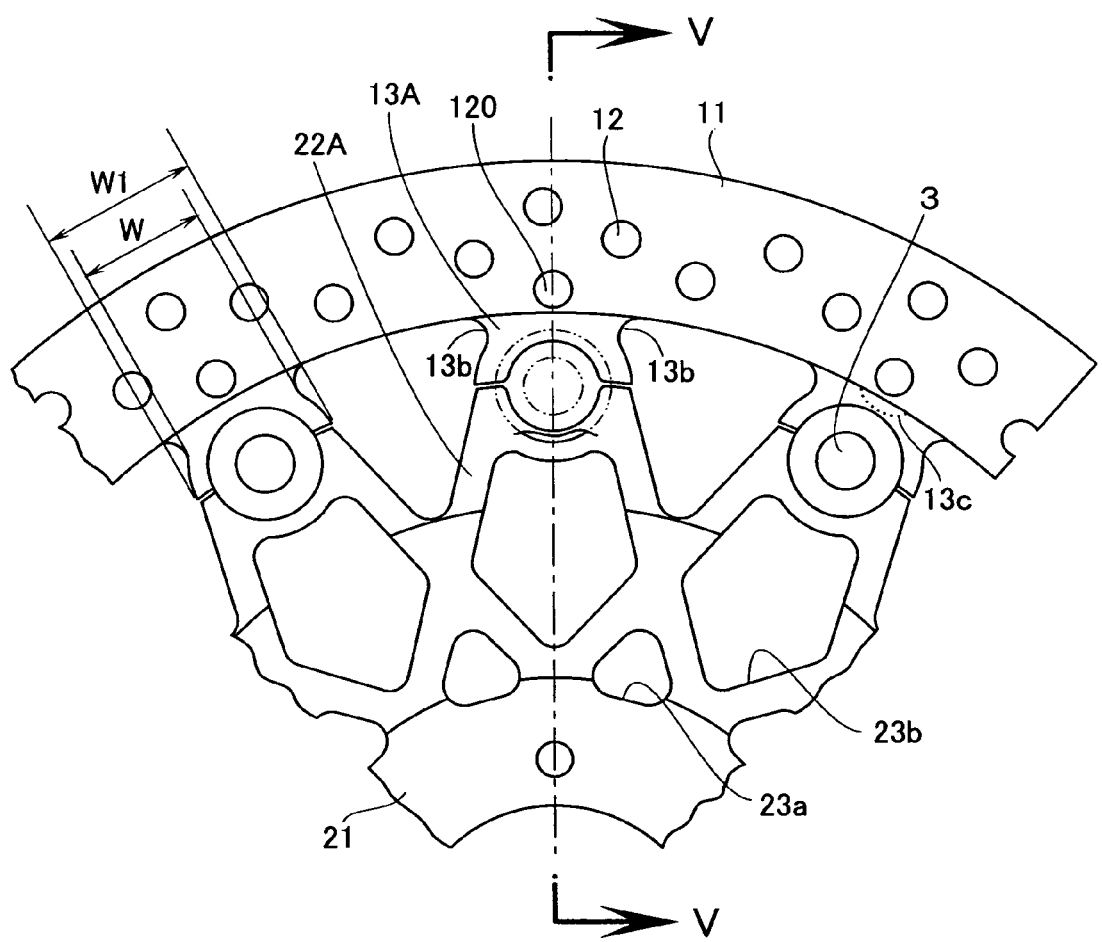
FIG. 4 is a partially enlarged explanatory view showing a connection between the braking rotor and the hub of FIG. 1.
Figure 5:
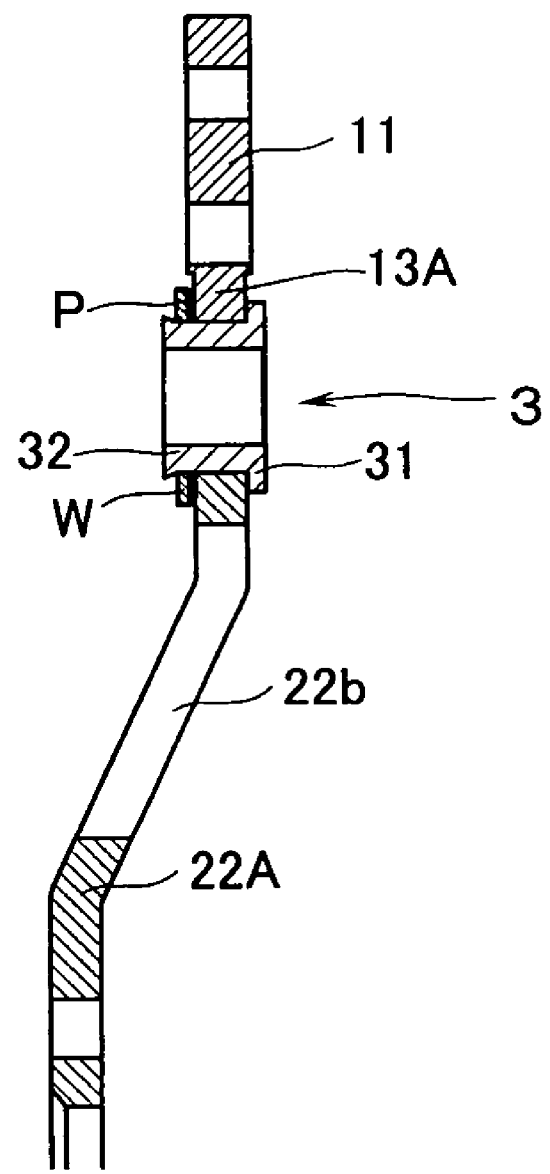
FIG. 5 is a cross sectional view taken along a line V-V of FIG. 4.

As shown in FIGS. 4 and 5, the braking rotor 1A and the hub 2A are connected each other as followings. Each tip ends of the arms 22a of the hub 2A is formed with a semicircular recess 220 (FIG. 3). On the other hand 12 projections 13A (FIG. 2) extending radially inward from the rotor portion 11 are arranged so that they correspond to the recesses 220 of the hub 2A. A recess 13a of semicircular configuration similar to the recess 220 is formed on the tip of each projection 13A. The braking rotor 1A and the hub 2A are connected each other in a floating fashion by abutting each projection 13A of the braking rotor 1A to each arm 22A of the hub 2A and then by inserting a connecting pin 3 (FIG. 3) forming a connecting means into an opening of substantially circular configuration formed by the semicircular recess 13a formed in the tip of each projection 13A and the semicircular recess 220 formed in the arm 22A of the hub 2A via a velleville spring "P" for axially urging the braking rotor 1A and the hub 2A and a washer "W" (FIG. 5).

The connecting pin 3 comprises a cylindrical portion 32 having substantially same outer diameter as the inner diameter of the opening formed by the recesses 13a and 220 and a flanged base portion 31 having a larger dimension than the opening formed by the recesses 13a and 220. The pin 3 is secured on the projection 13A and the arm 22A by axially inserting the cylindrical portion 32 of the pin 3 into the opening formed by the recesses 13a and 220 and then caulking the projected end of the cylindrical portion 32 with interposing the belleville spring P and washer W thereon after setting the flanged base portion 31 being contacted with the faces of the projection 13A and the arm 22A.

Such a fastening manner in the floating fashion enables to absorb the thermal expansion of the rotor portion 11 caused by heat generation during braking operation owing to gap between the rotor portion 11 and the hub 2A.

The heat generated in the rotor portion 11 during braking operation is transferred from the projections 13A of the rotor portion 11 to the arms 22A of the hub 2A via the flanged base 31 of the connecting pin 3 contacting both the projections 13A and the arms 22A. Under such a circumstance, temperature irregularity of large temperature difference would be caused in the rotor portion 11 since heat dissipation per unit time is locally enhanced at regions in which the projections 13A are formed on the rotor portion 11. Accordingly, it is necessary to reduce the irregularity of heat distribution in the rotor portion 11 caused during braking operations and thus to reduce generation of heat deformation and heat deterioration.

According to the floating type disc brake A of the first embodiment, each projection 13A is formed with cutout portions 13b symmetrically at either side of each projection 13A at the boundary region between the rotor portion 11 and the projection 13 A. In addition, a through aperture 120 which is one of the circular through apertures 12 is arranged near the boundary region between the rotor portion 11 and each projection 13A in order to improve the braking performance and to reduce the weight of the disc brake.

The provision of the cutout portions 13b contributes to reduction of the cross sectional area of heat transfer of each projection 13A at the boundary between the rotor portion 11 and the projection 13A and the provision of the one through aperture 120 near the boundary region between the rotor portion 11 and each projection 13A also contributes to reduction of cross sectional area of heat transfer at the region causing the heat dissipation from the rotor portion 11 to the projection 13A. Thus the heat dissipation per unit time from the rotor portion 11 to the projections 13A can be effectively suppressed by the provision both of the cutout portions 13b and the through apertures 120.

Accordingly local heat dissipation in the region at which each projection 13A is arranged in the rotor portion 11 can be prevented and the irregularity of the heat distribution in the rotor portion 11 during braking operations can be reduced. Thus the heat deformation and the heat deterioration of the rotor portion 11 can be suppressed and thus generation of cracks in each projection 13A can be also prevented.

Referring to FIG. 4, the dimension of each projection 13A is set to have a sufficient strength and is also set so that the minimum width "W" of the projection 13A at which the cutout portions 13b are formed is 90% or less than a width "W1" of the projection 13A in which no cutout portion is formed as well as the minimum cross sectional area of the projection 13A in which the cutout portions 13b are formed is set 90% or less than a cross sectional area of the projection 13A in which no cutout portion is formed.

Although it is described in the first embodiment that the cutout portions 13b of substantially semicircular configuration are symmetrically arranged at either side of each projection 13A, it is also possible to form other cutout portion 13c shown by a dotted line in FIG. 4 in each projection 13A at a boundary between the rotor portion 11 and the projection 13A to reduce the connecting area between the rotor portion 11 and each projection 13A. This cutout portion 13c may be formed in the rotor portion 11 separately from the through aperture 120.

Figure 6:
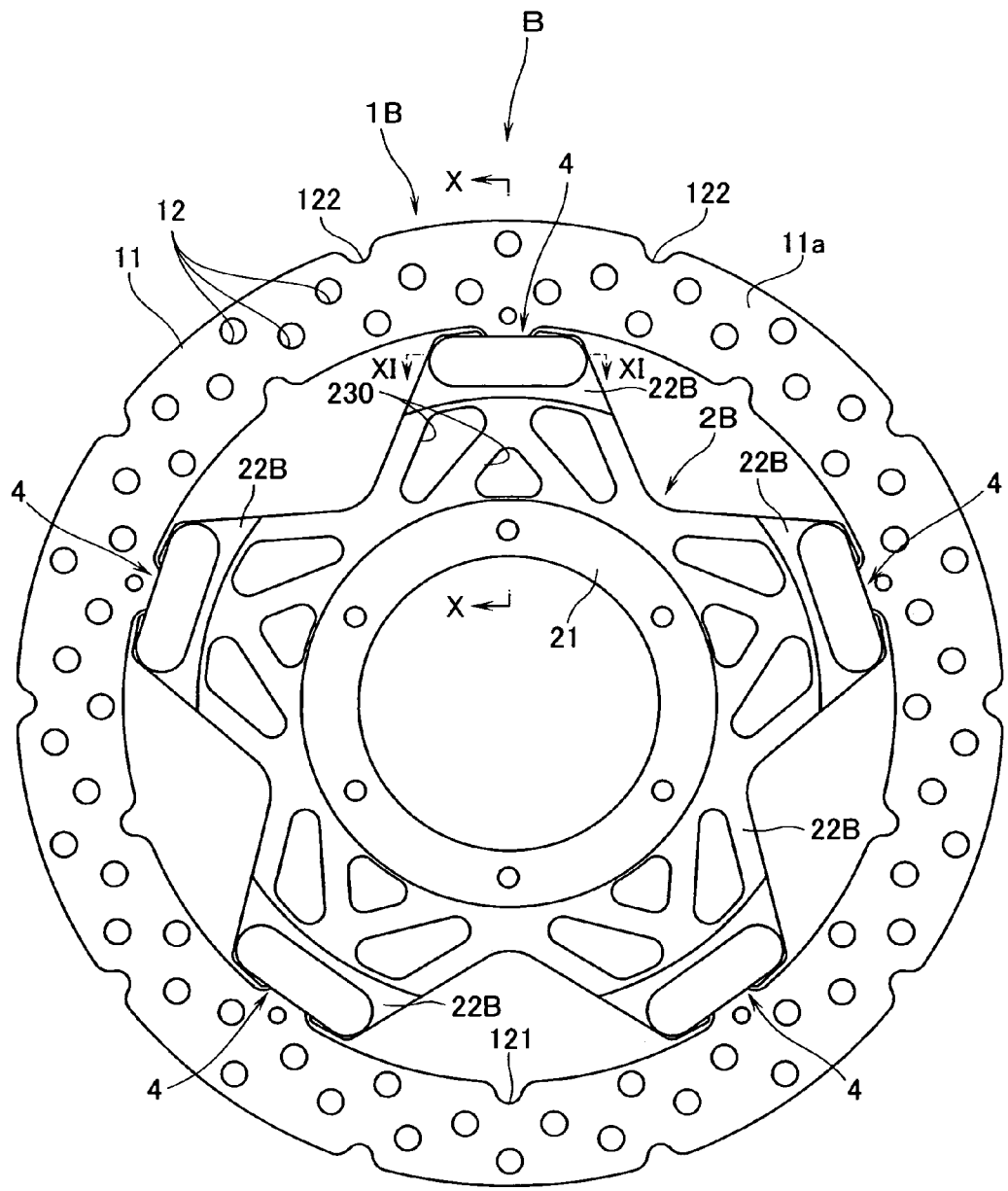
FIG. 6 is an explanatory front elevation view of a floating type disc brake of a second embodiment of the present invention.

Referring to FIG. 6~FIG. 11, a reference character "B" denotes a floating type disc brake of a second embodiment of the present invention (FIG. 6 is a view taken from the front side of the floating type disc brake B). The floating type disc brake B also comprises a braking rotor 1B and a hub 2B arranged inside the braking rotor 1B. Same reference numerals are used in drawings for designating same structural elements as those of the first embodiment.

Figure 7:
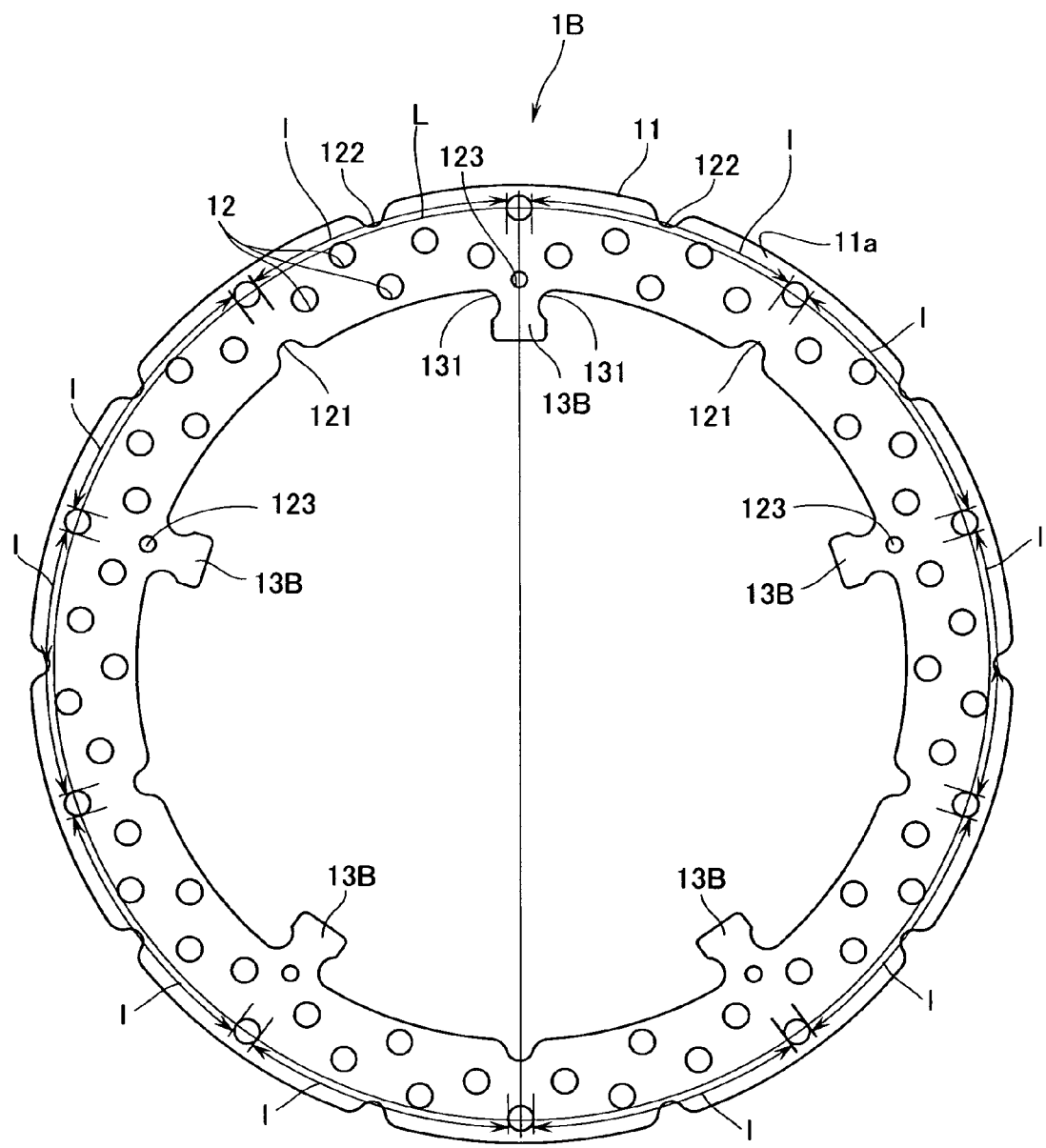
FIG. 7 is a front elevation view of a braking rotor of FIG. 6.
Figure 8:
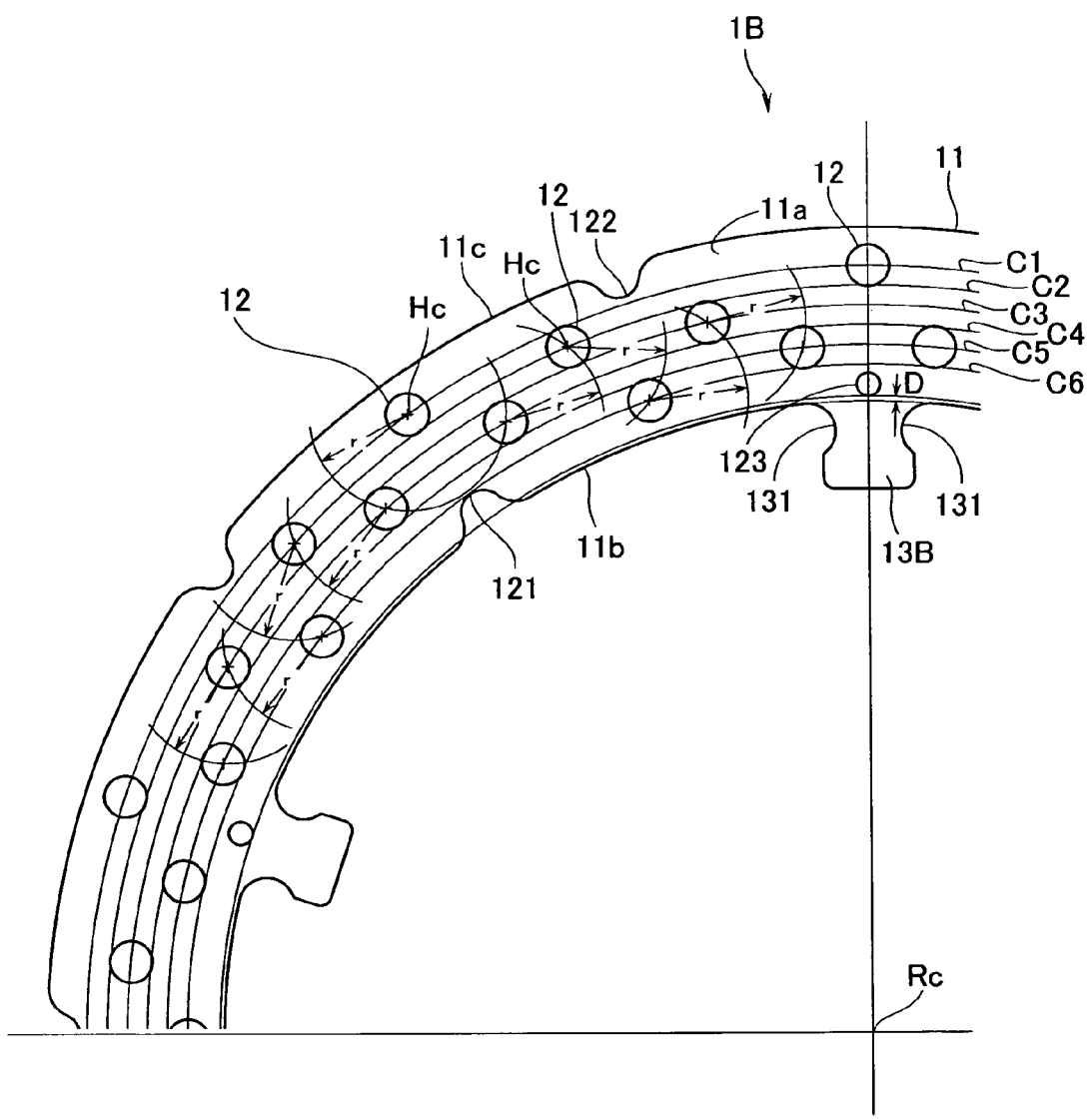
FIG. 8 is a partially enlarged explanatory view showing the braking rotor of FIG. 6.

As shown in FIGS. 7 and 8, the braking rotor 1B has a rotor portion 11 and axial surfaces 11a of the rotor portion 11 are formed with a plurality of circular through apertures 12 of a same diameter in order to improve the braking performance and to reduce the weight of the rotor portion 11. The rotor portion 11 is adapted to be sandwiched by brake pads mounted on a caliper "Z". In such a case it is afraid that heat deformation or heat deterioration would be caused in the rotor portion by a large temperature irregularity repeatedly caused by the braking operation.

In this second embodiment, the diameter of each through aperture 12 is set at a predetermined value and the positioning and the number of it is set as followings. That is, the center Hc of each through aperture 12 is positioned on either one of a plurality of circles C1~C6 of a first group having its center on the rotational center Rc of the braking rotor 1B, and centers of other two through apertures 12 are positioned on one of a plurality of circles of a second group having a predetermined radius "r" from the center Hc of said through passage 12 on one of the circles C1~C6 of the first group as well as positioned on the other one of the circles C1~C6 of the first group having a different radius from said circles of the first group.

In this case, it is preferable that a ratio of a total of partial length of any one of circles C1~C6 of the first group which does not pass through the through apertures 12 (i.e. total of a distance "1" between adjacent through apertures 12 on any one of circles C1~C6 of the first group) relative to a total length "L" (FIGS. 7 and 8) of any one of circles C1~C6 of the first group is within a range 76~89%. When the ratio is less than 76% or more than 89%, it is impossible to have a sufficient strength of the rotor portion 11 and to suppress the irregularity of heat distribution on the surfaces of the rotor portion 11. In addition, in order to always maintain a good braking performance with whole surfaces of the brake pads being cleaned by edges of the through apertures 12, the edge portions of the through apertures 12 are arranged so that they are positioned at or near mutually adjacent circles C1~C6 of the first group.

Furthermore, at least one of the inner and outer circumferential portions 11b and 11c of the braking rotor 1B is formed with substantially semi-circular cutouts 121 and 122 in order to remove portions in which amount of temperature rise during braking operations is small. In this case, each cutout 121 and 122 is formed as having half cross sectional area of that of each through aperture 12. Similarly to the description above, the size of the through apertures 121 and 122 is determined so that a ratio of a total of partial length which does not pass through the through apertures 121 and 122 relative to a total length of the inner or outer circumference having a center on the center Rc of rotation of the braking rotor is within a range 76~89%.

Figure 9:
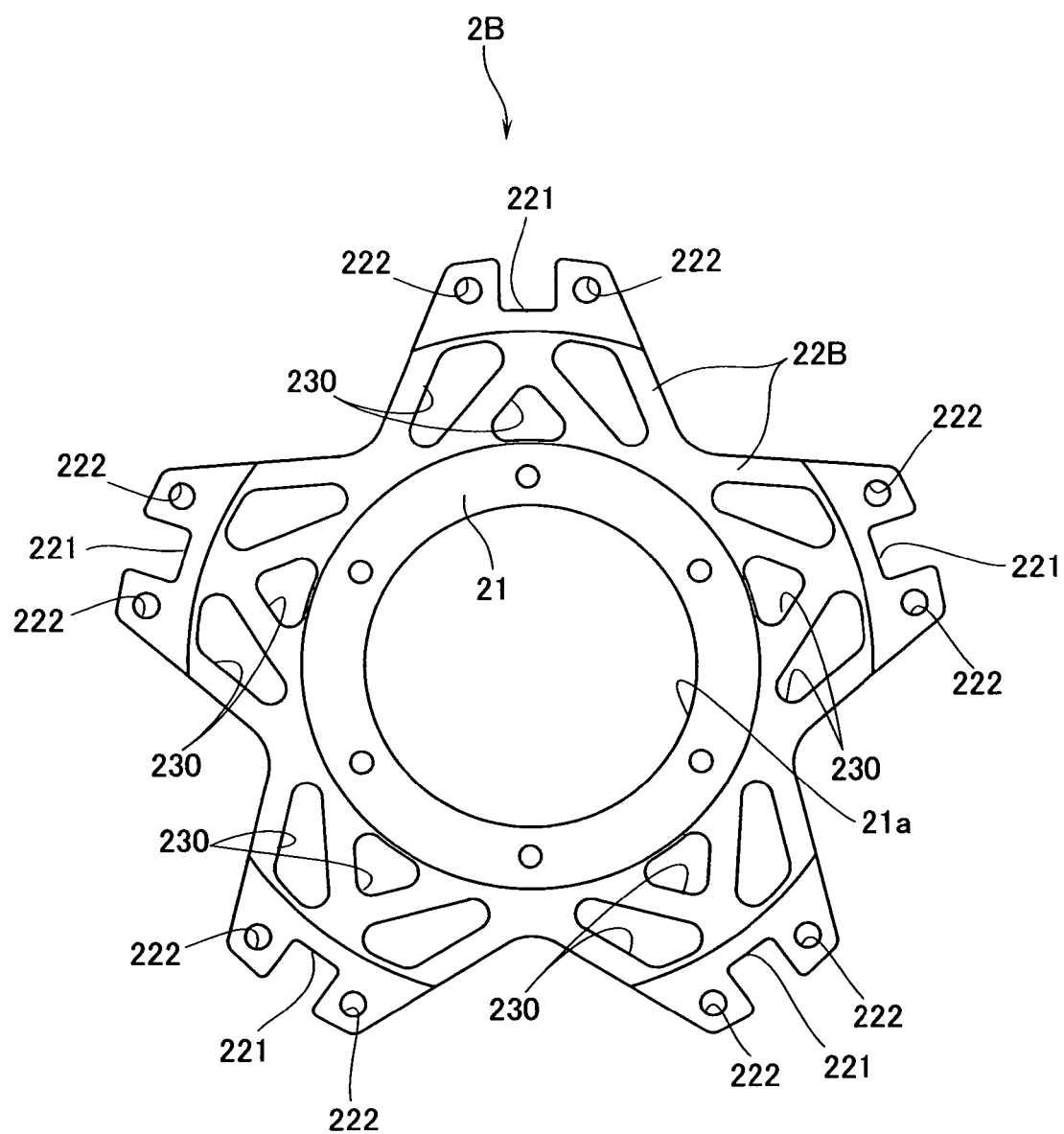
FIG. 9 is a front elevation view of a hub of FIG. 6.
Figure 10:
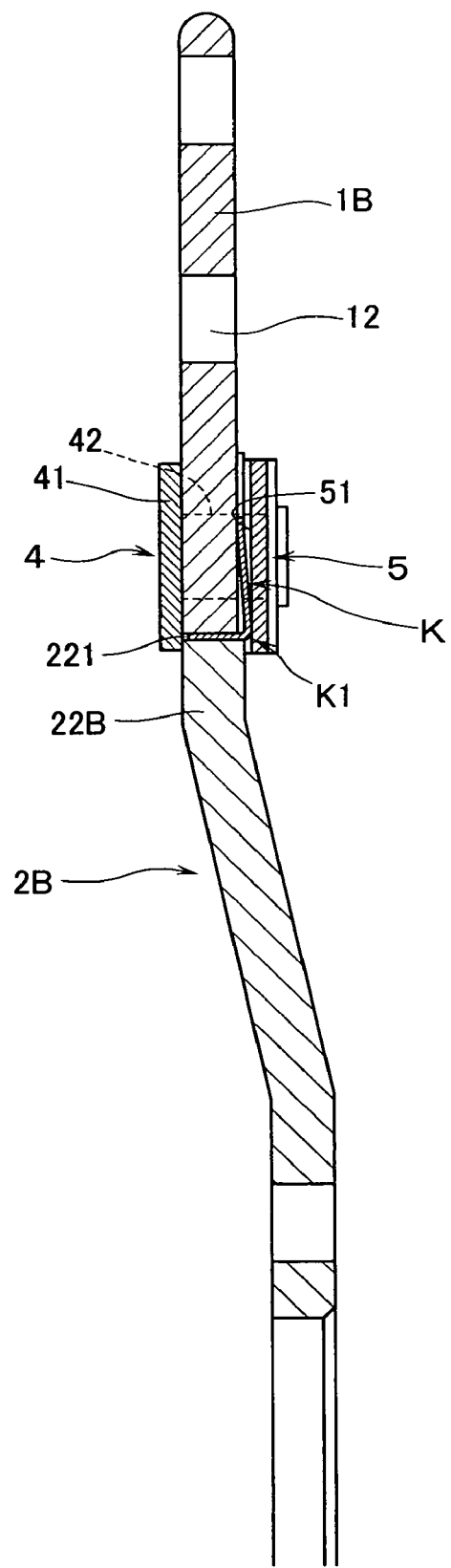
FIG. 10 is a cross sectional view taken along a line X-X of FIG. 6.
Figure 11:
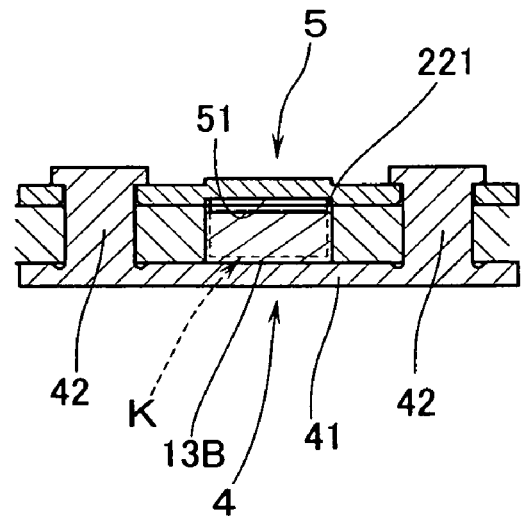
FIG. 11 is a cross sectional view taken along a line XI-XI of FIG. 6.
Figure 12:
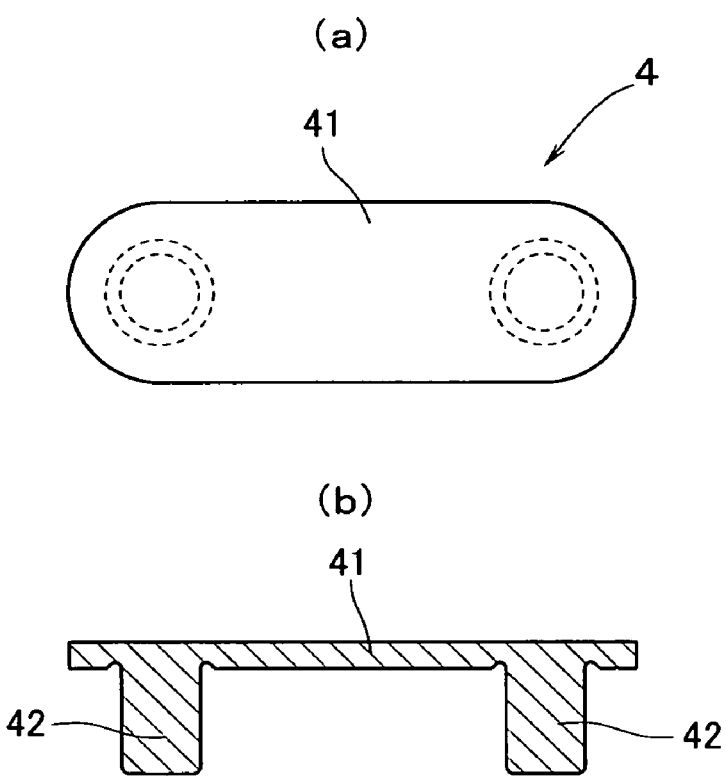
FIGS. 12 (a) and (b) are explanatory views of one of pressing plates used for connecting a braking rotor and a hub of a floating type disc brake of a second embodiment of the present invention.

As shown in FIG. 9 the hub 2B of the second embodiment is intended to reduce weight of the floating type brake disc B and comprises a flat circular base portion 21 formed with a central opening 21a for mounting to an axle of vehicle and five arms 22B extending radially outward from the base portion 21 equidistantly apart each other and having a substantially "star" configuration taken from its front side. A plurality of through apertures 230 are formed in the arms 22B to reduce the weight of the hub 2B. Although illustrated a five-arm type hub in the drawings as the second embodiment, the number of the arm can be appropriately selected.

Although the irregularity of the heat distribution on the surfaces of the rotor portion 11 by forming the rotor portion 11 as previously described, large temperature irregularity would be caused in the rotor portion 11 if the heat generated in the rotor portion 11 during braking operations is positively transferred to the nub 2B via connecting portions of the braking rotor 1B.

According to the second embodiment, the outer circumferential portion of each arm 22B of the hub 2B is formed with a cutout portion 221 and the inner circumferential portion of the rotor portion 11 is formed with five projections 13B corresponding to the cutout portions 221 of the hub 2B (FIGS. 7 and 9). The thickness of the projections 13B is same as that of the rotor portion 11 and the length of the projections 13B in the radial direction is determined so that a predetermined gap is remained between the tip end of each projection 13B and the bottom of each cutout portion 221 when the projections 13B are fitted in the cutout portions 221.

Cutout portions 131 are symmetrically formed at both radially extending sides of each projection 13B at the boundary region between the rotor portion 11 and projection 13B and through apertures 123 are formed in a projected region of the projections 13B to the rotor portion 11 at positions apart a distance "D" larger than the thickness of the rotor portion 11 from the boundary between the rotor portion 11 and the projections 13B. Although the diameter of each through aperture 123 is illustrated as having a smaller diameter than that of the through aperture 12 to provide a sufficient strength to the braking rotor 1B, it is possible to form the through aperture 123 as having a same diameter as that of the through aperture 12.

Thus the heat transferring area at the region in which the heat dissipation from the rotor portion 11 to the projections 13B is caused can be reduced with keeping a sufficient strength of the braking rotor 1B. Accordingly, it is possible to suppress the heat dissipation per unit time from the rotor portion 11 to each projection 13B and thus to reduce the temperature irregularity in the rotor portion during braking operations.

The braking rotor 1B can be connected to the hub 2B as followings. Firstly the hub 2B is arranged inside the braking rotor 1B with each projection 13b being fitted into each cutout 221. Then an urging means K or a leaf spring (FIG. 10) for limiting axial relative movement between the braking rotor 1B and the hub 2B and a constricting means 4 and 5 for preventing axial separation between the braking rotor 1B and the hub 2B are arranged at regions in which the projections 13B are fitted in the cutouts 221. Thus axial urging of the braking rotor 1B and prevention of slipping out of the braking rotor 1B can be achieved by the urging means K and the braking rotor 1B can be connected to the hub 2B in a floating condition.

Referring to FIGS. 10~13, the constricting means 4 and 5 comprises a pair of pressing plates 4 and 5 for covering the region in which the projections 13B of the braking rotor 1B are fitted in the cutouts 221 of the hub 2B from axially either side of said region and contacting at least axial surfaces of the hub 2B. One pressing plate 4 comprises a plate-shaped portion 41 and two cylindrical legs 42 extending from the plate-shaped portion 41 (FIGS. 12 (a) and (b)).

Figure 13:
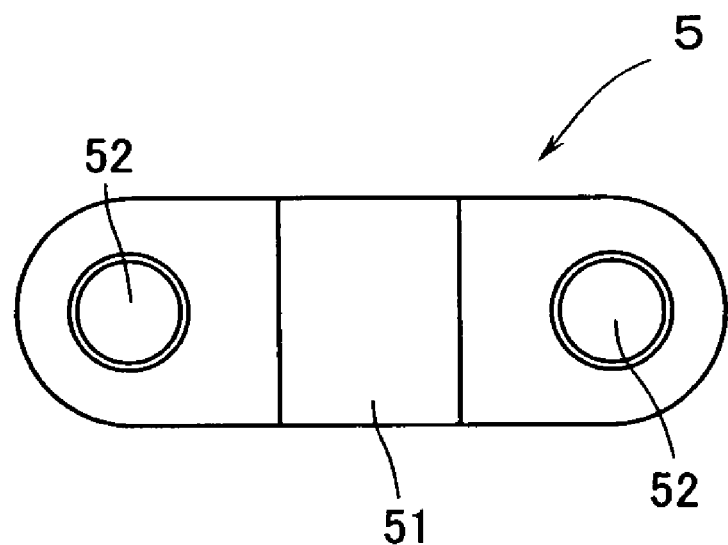
FIGS. 13 (a) and (b) are explanatory views of the other of the pressing plates used for connecting the braking rotor and the hub of the floating type disc brake of the second embodiment of the present invention.
Figure 13:
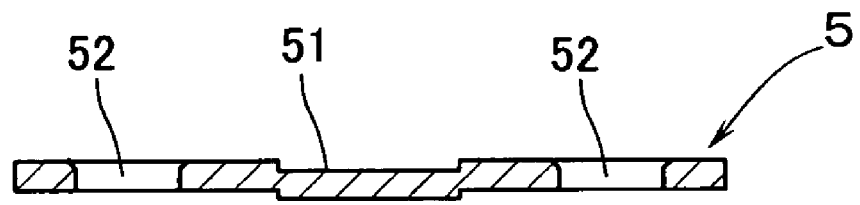

As shown in FIGS. 13 (a) and (b), the other pressing plate 5 arranged oppositely to said one pressing plate 4 sandwiching therewith the projection 13B and the hub 2B has a substantially same configuration as the plate-like portion 41 and is formed with a shallow groove 51 for containing the urging means K. In addition the pressing plate 5 is formed with two openings 52 for receiving the legs 42 of the mating pressing plate 4.

The hub 2B is formed with two openings 222 (FIG. 9) corresponding to these legs 42 at either side of the cutout 221. The braking rotor 1B is secured to the hub 2B by inserting the legs 42 into the openings 222 of the hub 2B and the openings 52 of the pressing plate 5 and then by caulking the tip ends of the legs 42. This assembling operation can be easily achieved by simple caulking operation without causing variation of urging force of the spring K since the shallow groove 51 for containing the urging means K is formed. Provision of two caulked portions can provide an effective spring characteristics of the urging means K and also provide a simple and strong connecting structure between the braking rotor 1B and the hub 2B without being separated even though a large centrifugal force is applied thereto. Aesthetic feeling will not be marred when the caulked portions of the legs 42 are arranged at rear side of the braking disc.

Figure 14:
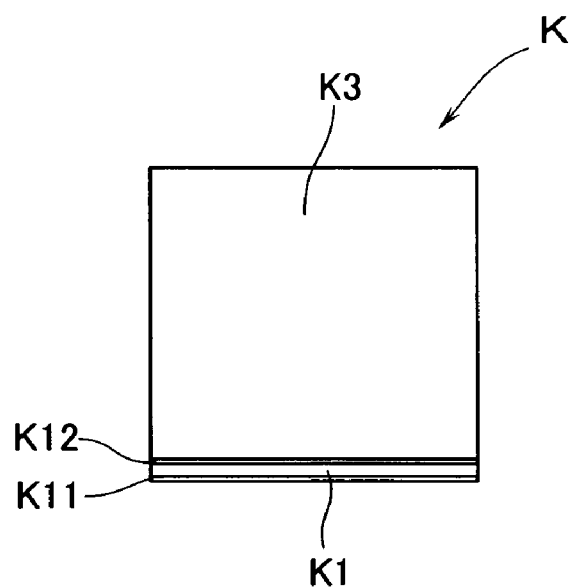
FIGS. 14 (a) and (b) are explanatory views of an urging means for urging the braking rotor and the hub of the floating type disc brake of the second embodiment of the present invention.
Figure 14:
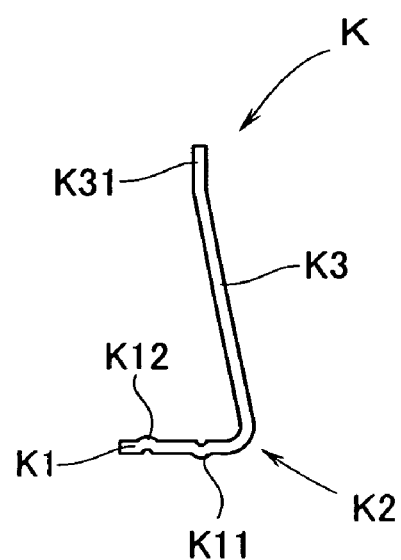

The urging means is formed by a leaf spring K as shown in FIG. 14. The leaf spring K is made of a sheet for example of stainless steel having predetermined dimensions. One end of the sheet material is bent at substantially right angle to form a supporting portion K1 and a remained portion from the bent K2 forms an urging portion K3. A fore end K31 of the urging portion K3 is further bent as having a "chevron" configuration so as to yield an axial urging force with contacting the surface of the rotor portion 11. Raised portions K11 and K12 raised in a width direction of the sheet material are formed on upper and lower surfaces of the supporting portion K1.

The leaf spring K is mounted on the disc brake by inserting the supporting portion K1 into a gap between the tip end of each projection 13B and the bottom of the cutout 221. The leaf spring K acting on the rotor portion 11 can be positioned with the raised portions K11 and K12 being contacted respectively with the tip end of each projection 13B and the bottom of the cutout 221. In addition an axial movement of the leaf spring K is limited with the bent K2 of the leaf spring K being contacted with the shallow groove 51 of the pressing plate 4 when it is mounted on the disc brake.

According to the second embodiment, the thickness of the projection 13B is set so that it is smaller than that of the hub 2B. Thus the braking rotor 1B can axially move between the plate-like portion 41 of the pressing plate 4 and the other pressing plate 5 and contribute to reduction of weight of the disc brake. In this case, it may reduce only the thickness of the projections 13B.

In the floating type disc brake B of the second embodiment, combination of characteristic features, that is, the through apertures 12 are arranged so that they can reduce the irregularity of heat distribution on the surfaces of the rotor portion 11 during braking operation; the heat dissipation from the braking rotor 1B to the hub 2B is suppressed; and portions in which an amount of heat generation caused by brake pads during braking operations is small are removed makes it possible to reduce the irregularity of the heat distribution on the surfaces of the rotor portion 11 during braking operation. Accordingly it is possible to prevent generation of the heat deformation and heat deterioration of the rotor portion 11 even though braking operations are repeatedly applied thereto and also to reduce the weight of the disc brake.

Then assembly of the floating type disc brake B of the second embodiment of the present invention will be described. Firstly one pressing plate 4 is placed so that its plate-like portion 41 faces downward and the hub 2B is set so that its rear side faces upward and the legs 42 of the pressing plate 4 are inserted into the openings 222 of the hub 2B. Then the braking rotor 1B is placed outside the hub 2B so that its rear side faces upward with fitting the projections 13B of the braking rotor 1B into cutouts 221 of the arms 22B of the hub 2B. In this case it is unnecessary to exactly position the braking rotor 1B and the hub 2B so that their concentricity is attained.

Then the supporting portion K1 of the leaf spring K is inserted into the gap between the tip end of each projection 13B and the cutout 221. In this case, the raised portions K11 and K12 contact each tip end of the projection 13B and the bottom of the cutout 221 and thus positioning of the leaf spring K and positioning of the braking rotor 1b relative to the hub 2b are attained.

Then the other pressing plate 5 is arranged by inserting the legs 42 projected upward from the hub 2B into the opening 52 of the pressing plate 5. The bent K2 of the leaf spring K contacts the shallow groove 51 of the pressing plate 5. The hub 2B and the braking rotor 1 are connected each other by caulking the tip ends of the legs 42 projected from the pressing plate 5. In this arrangement, although the leaf spring K is axially constricted, the urging force of the leaf spring K applied to the rotor portion 11 does not change.

Figure 15:
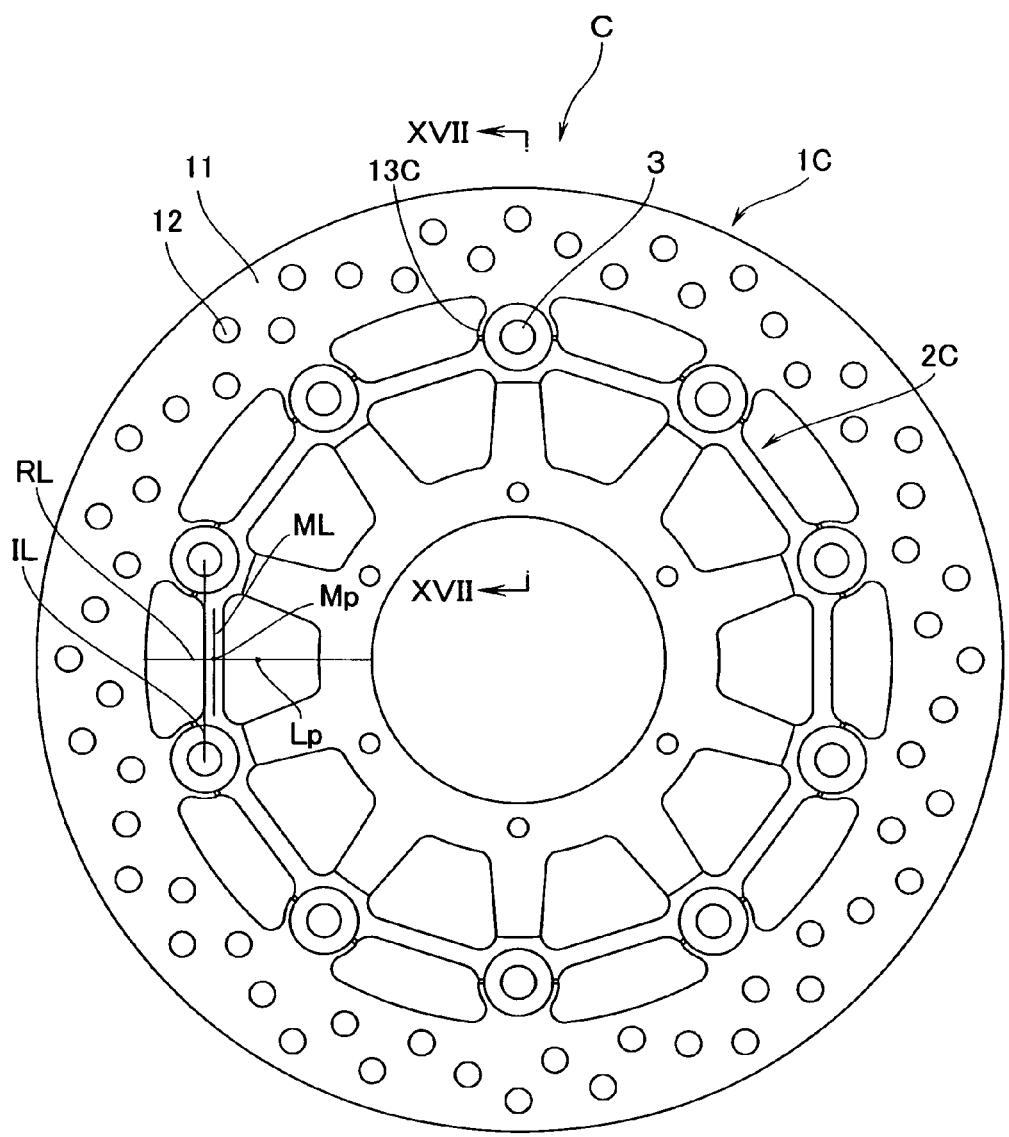
FIG. 15 is an explanatory front elevation view of a floating type disc brake of a third embodiment of the present invention.
Figure 16:
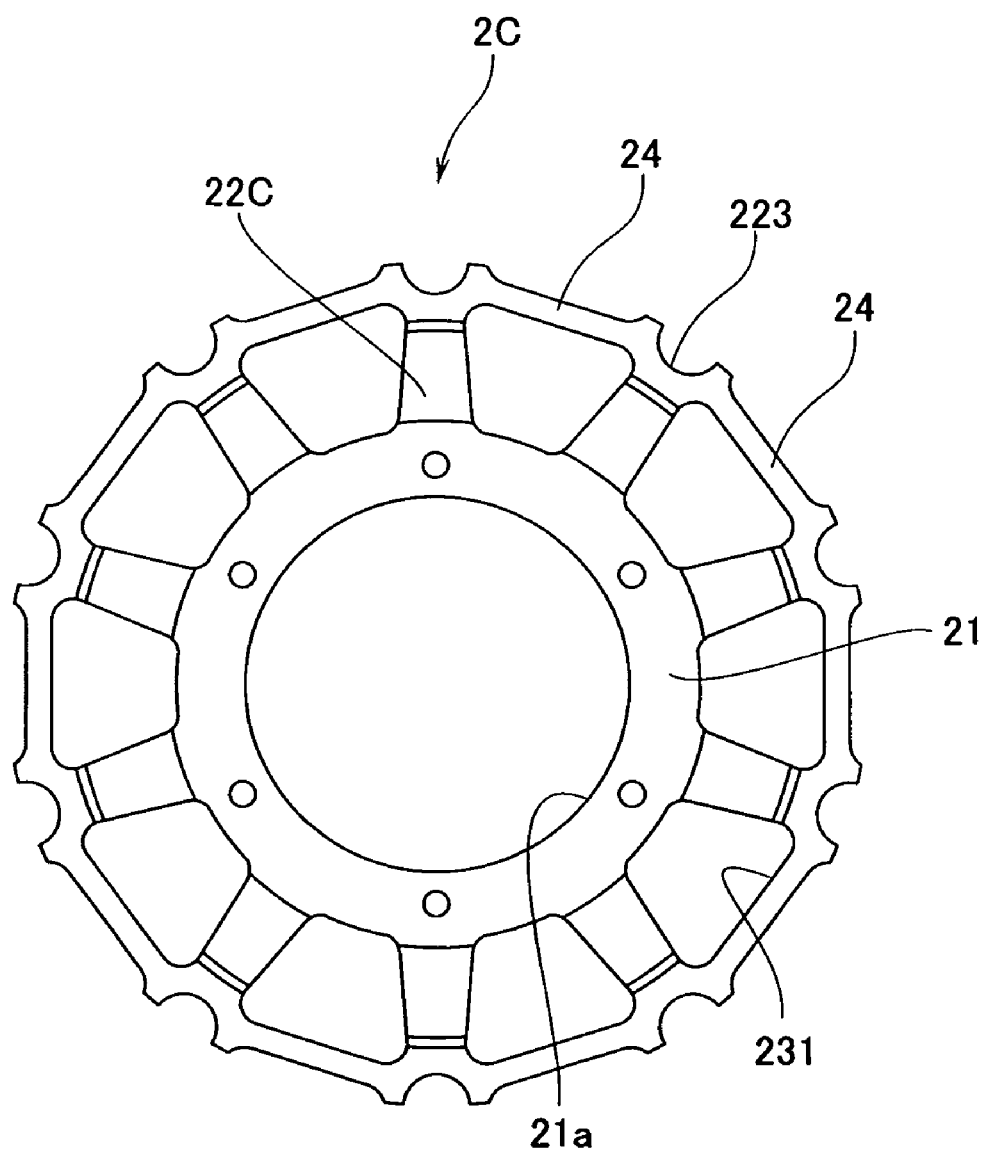
FIG. 16 is a front elevation view of the hub of FIG. 15.
Figure 17:
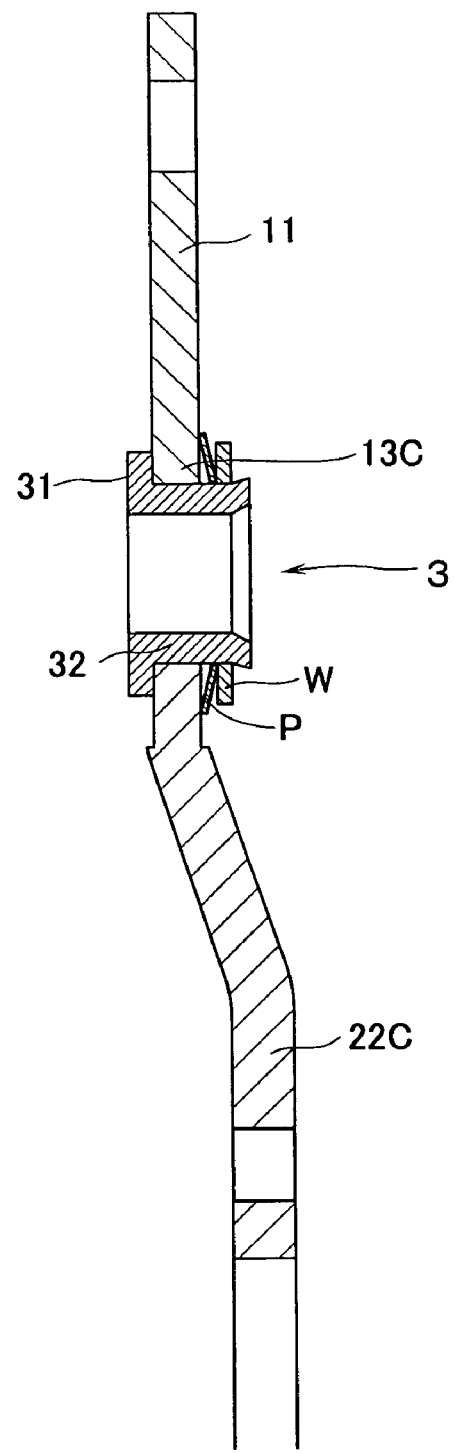
FIG. 17 is a cross sectional view taken along a line XVII-XVII of FIG. 15.

Referring to FIG. 15~FIG. 18, a reference character "C" denotes a floating type disc brake of a third embodiment of the present invention (FIG. 15 is a view taken from the front side of the floating type disc brake C). The floating type disc brake C also comprises a braking rotor 1C and a hub 2C arranged inside the braking rotor 1C. Same reference numerals are used in drawings for designating same structural elements as those of the first and second embodiments.

The braking rotor 1C is formed similar to that of the first embodiment and has ten (10) projections 13C projecting from the inner circumferential portion of the rotor portion 11 at a predetermined distance apart from each other. The number of the projections 13C correspond to that of the arms 22C of the hub 2C. Each tip end of the projection 13C is formed with a semi-circular cutout 13a.

The hub 2C (FIG. 16) is made of metal material such as stainless steel or aluminum alloy. Although the hub 2C is required to reduce its own weight to reduce fuel consumption of a vehicle equipped with the disc brake C, it is necessary that the hub 2C has sufficient strength.

The hub 2C comprises a flat circular base portion 21 formed with a central opening 21a for mounting to an axle "S" (FIG. 1) of vehicle, ten arms 22C extending radially outward from the base portion 21 equidistantly apart each other, and straight beam-like portions 24 each connecting two adjacent arms 22C near the tip end of each arm 22C. The hub 2C is formed from a starting material of a disc shaped work formed with the base 21 by stamping starting material to form through apertures 231 of substantially trapezoidal configuration equidistantly on a same circle and the straight beam-like portions 24. It is preferable to form round inner corners connecting the arms 22C and the beam-like portions 24 in order to prevent stress concentration.

As shown in FIG. 15, the beam-like portions 24 are formed so that a longitudinal center line ML of the beam-like 24 is positioned radially inside an imaginary line IL connecting centers of bases 31 of mutually adjacent connecting pins 3 as well as a middle point Mp of the beam-like portion 24 is positioned radially outside a middle point Lp of a radial line RL connecting the inner circumferential portion of the rotor portion 11 and the outer circumferential portion of the central opening 21a. The tip end of each arm 22C is formed with a semicircular cutout 223 corresponding to a semicircular cutout formed on the tip end of the projection 13C. Thus a substantially circular opening is formed when each projection 13C of the braking rotor 1C is abutted to the arm 22C of the hub 2C.

Figure 18:
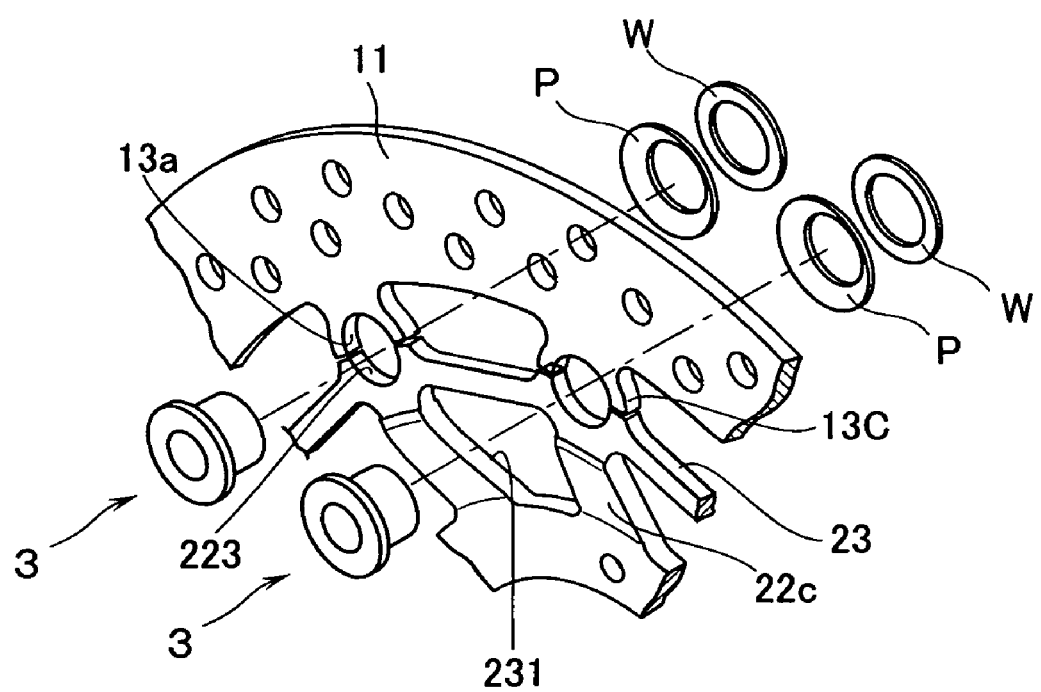
FIG. 18 is a partially enlarged explanatory view showing a connection between the braking rotor and the hub of FIG. 15.

As shown in FIG. 18, the braking rotor 1C and the hub 2C are connected in the floating condition by inserting the connecting pin 3, via a belleville spring "P" axially urging the connecting pin 3 toward the braking rotor 1C and the hub 2C and a washer "W", into a substantially circular opening formed by the semicircular cutout 13a of each projection 13C of the braking rotor 1C and a semicircular cutout 223 of the arm 22C of the hub 2C with abutting the projections 13C and the arm 22c each other. The connecting pin 3 has a same structure as that of the first embodiment.

Accordingly when a load during braking operations is applied to the hub 2C via contacting surfaces of the cylindrical portion 32 of the connecting pin 3 and the cutout 223 formed in the tip end of the arm 22C, the input point of the load to the hub 2C resides inside the imaginary line IL. Since the straight beam-like portion 24 is positioned at either side of said input point, the input load to the hub 2C can be received by the beam-like portion 24 in a distributed fashion. Thus the hub 2C can have a sufficient strength although the beam-like portion 24 has a small cross sectional area (i.e. thickness of the beam-like portion) in the load input direction. In addition since the middle point Mp of the beam-like portion 24 is positioned radially outside the middle point Lp of the radial line, it has a sufficient strength against a torsional load. Furthermore, since the strength of the hub 2C is increased by provision of the beam-like portions, sufficient strength can be obtained although the cross sectional area of each arm 22C (thickness of the arm) in a load input direction is reduced.

In this case the cross sectional area of the beam-like portion 24 in the load input direction can be reduced about 17% in a same strength against an axial load as compared with the prior art having a circular arc in the beam since the connecting portion of the beam-like portion 24 of the present invention is straight and thus connects the arms at a shortest distance. After assembly of the braking rotor 1C and the hub 2C, a test of measurement of a maximum deflection of the connecting pin 3 was carried out by applying an axial load to the pin 3. As a result of which, it is found that the maximum deflection of the disc brake of the third embodiment of the present invention using straight beam-like portions is smaller than that of the prior art using beam-like portions each having circular arc configuration and substantially uniform results can be obtained at plurality of measuring points along the circumferential portion of the rotor portion 11. In addition a maximum value of stress under a predetermined braking torque condition can be also reduced. This shows the disc brake of the third embodiment of the present invention can provide a sufficient strength and effective weight reduction.

Although it is illustrated and described that the hub 2C has ten arms, the number of the arm of the hub is not limited to this embodiment. For example, same effects will be obtained in the five-arm type hub 2B in the second embodiment by providing it with the beam-like portions 24.

Example 1

In the example 1, the disc brake A of the first embodiment shown in FIG. 1 was manufactured and temperature distribution of the rotor portion 11 during braking operations was measured. The braking rotor 1A was made of stainless steel and cutouts portions 13b of circular arc configuration were formed at either side of each projection 13A (In this case, the cross sectional area at a portion of minimum width in which the cutout portion 13b is formed is set at 85% of that in which no cutout is formed). In addition one through aperture 120 was formed at the boundary between the rotor portion 11 and each projection 13A.

The test was carried out using a commercially available caliper and brake pads under conditions; inertial mass: 1.25 Kgf·m·S$^2$, speed of rotation: 1760 rpm, deceleration: 0.7 G, brake oil pressure: 14 Kgf/cm$^2$. The number of braking was one time. A picture showing the temperature distribution of the rotor portion 11 immediately after stop of the disc brake A is shown in FIG. 19.

Comparative Example 1

The disc brake of this Comparative Example 1 is twelve arm type disc brake A of FIG. 1 similarly to the Example 1, which however is not formed with any cutout as well as any through aperture at the boundary between the rotor portion and each projection. The conditions of measurement were same as those in the example above and the number of braking was one time. A picture showing temperature distribution of the rotor portion immediately after stop of the disc brake is shown in FIG. 20.

Figure 19:
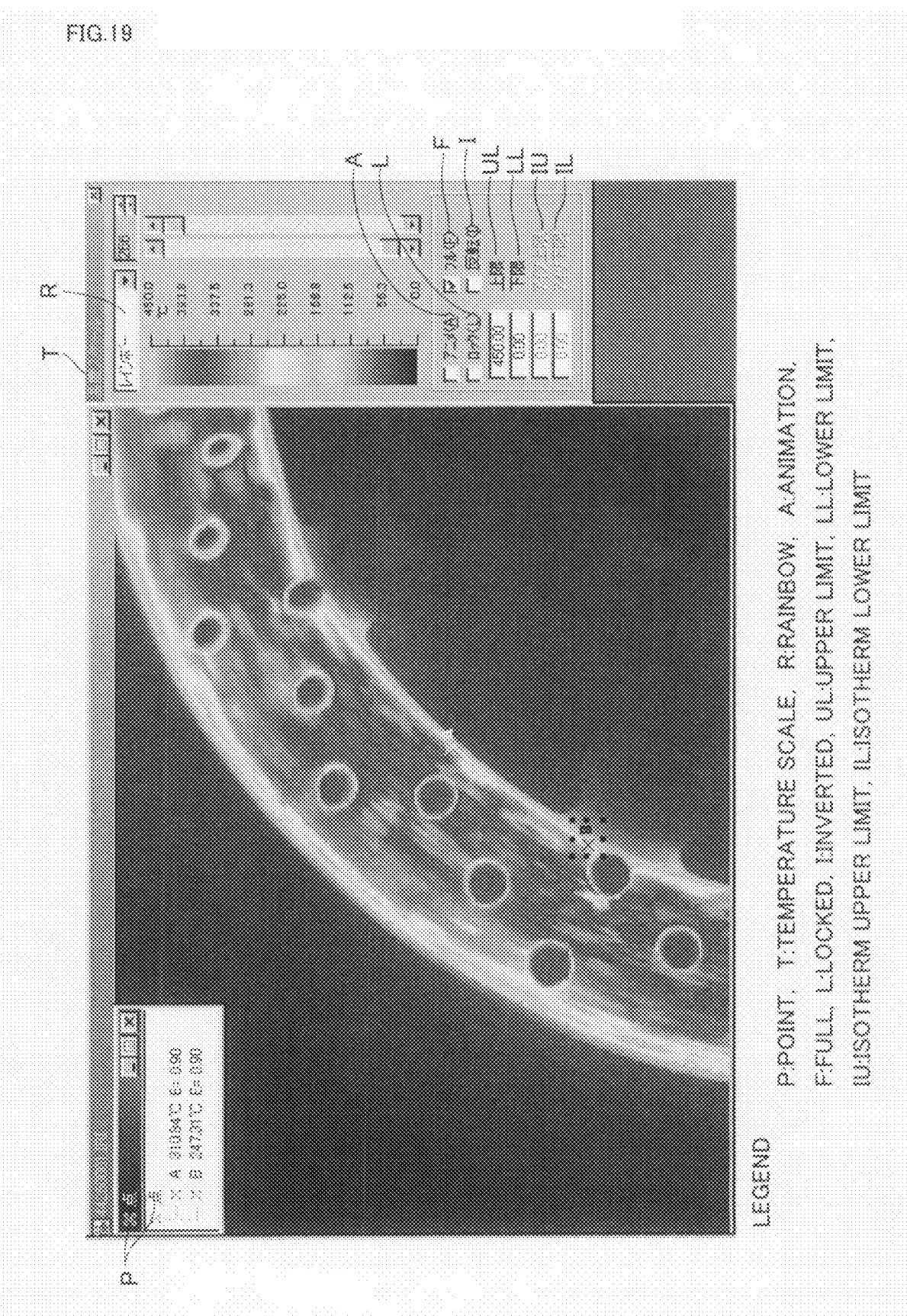
FIG. 19 is a picture showing the temperature distribution of the rotor portion of the floating type disc brake of the first embodiment taken after braking operations.
Figure 20:
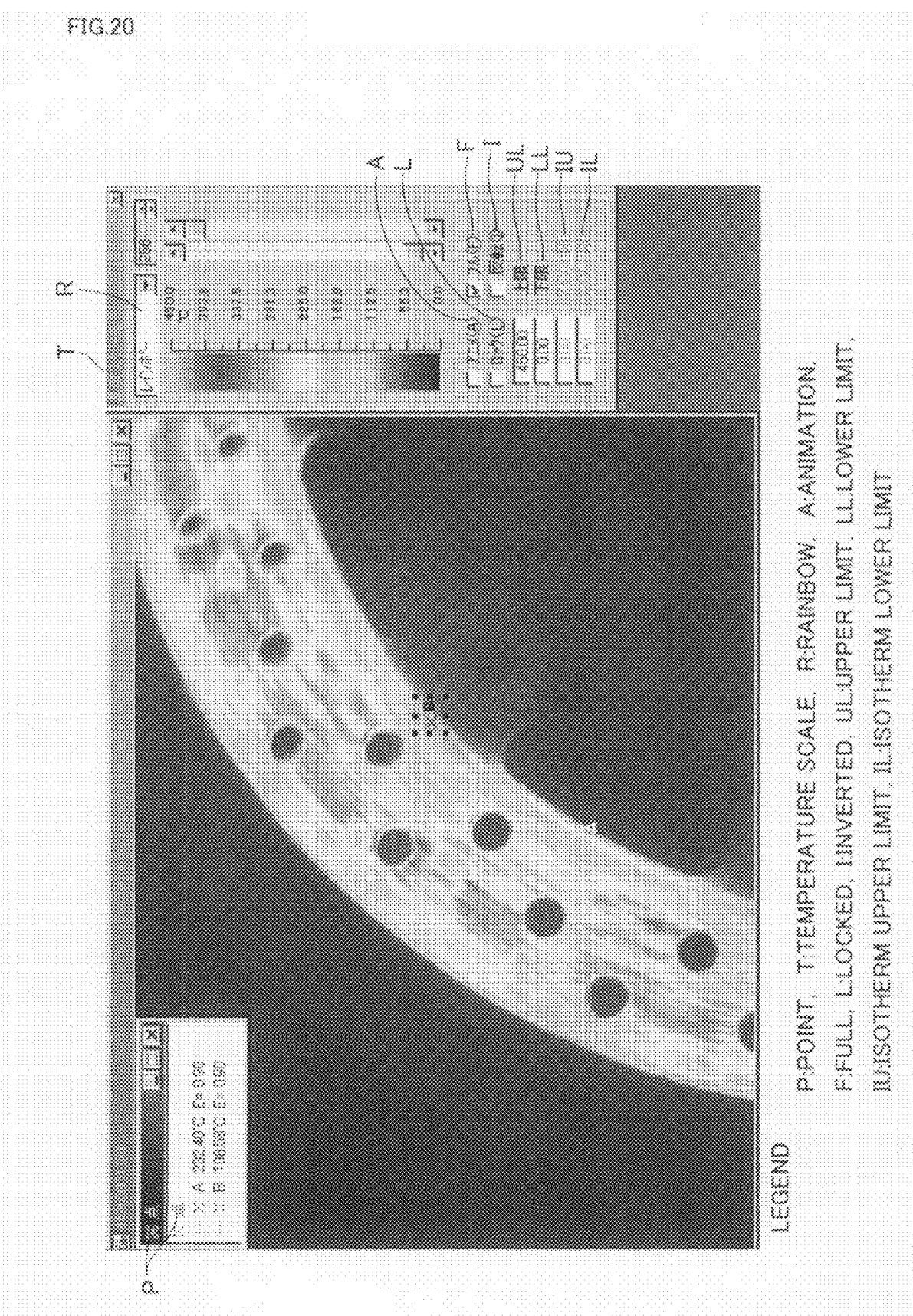
FIG. 20 is a picture showing the temperature distribution of the rotor portion of the comparative example 1.

Referring to FIGS. 19 and 20, in the Comparative example 1, when measured temperature of two points, that is, a point "A" positioned between two projections and a point "B" near each projection, it was 232° C. at point A and on the other hand 109° C. at point B. Thus it exhibited that the heat dissipation near the projection was locally promoted and thus degree of temperature drop was increased. In this case, it is found that the difference in temperature between the point A and point B is 123° C. and thus there is a large temperature irregularity.

On the contrary, in the Example 1, when measured temperature of two points A and B which are substantially same points in the Comparative Example 1, it was 311° C. at point A and on the other hand 247° C. at point B and thus the difference in temperature is 64° C. Accordingly it is found that the Example 1 can reduce the temperature irregularity about 50% relative to the Comparative Example 1 and also reduce the irregularity in the heat distribution in the rotor portion 11 during braking operations.

Example 2

In the Example 2, the temperature distribution in the rotor portion 11 during braking operations was measured as to the disc brake B of the second embodiment shown in FIG. 6. The braking rotor 1B was made of stainless steel and cutouts portions 131 of circular arc configuration were formed at either side of each projection 13B and cutouts 121 were formed in the inner circumferential portion of the rotor portion 11.

Figure 21:
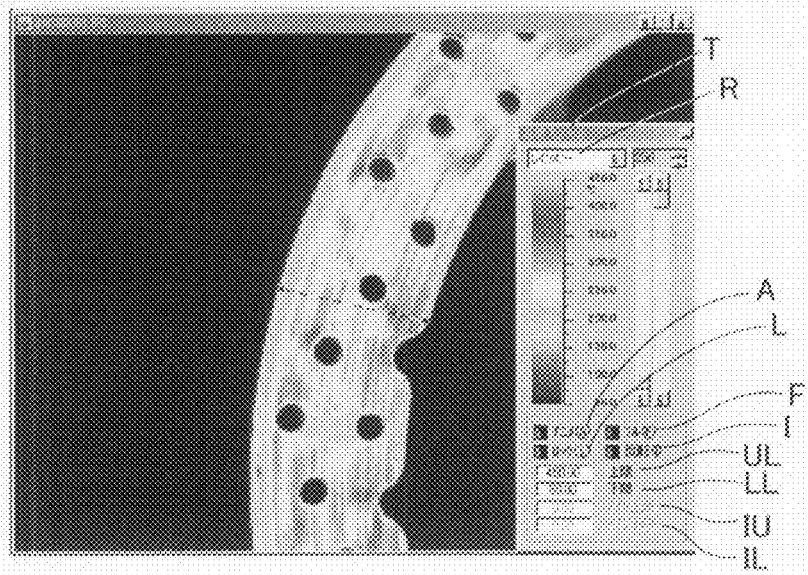
FIG. 21 (a) is a picture showing the temperature distribution of the rotor portion of the floating type disc brake of the second embodiment taken after one braking operation, and FIG. 21 (b) is a graph showing the temperature distribution along a radial direction of the rotor portion of FIG. 21 (a)
Figure 21:
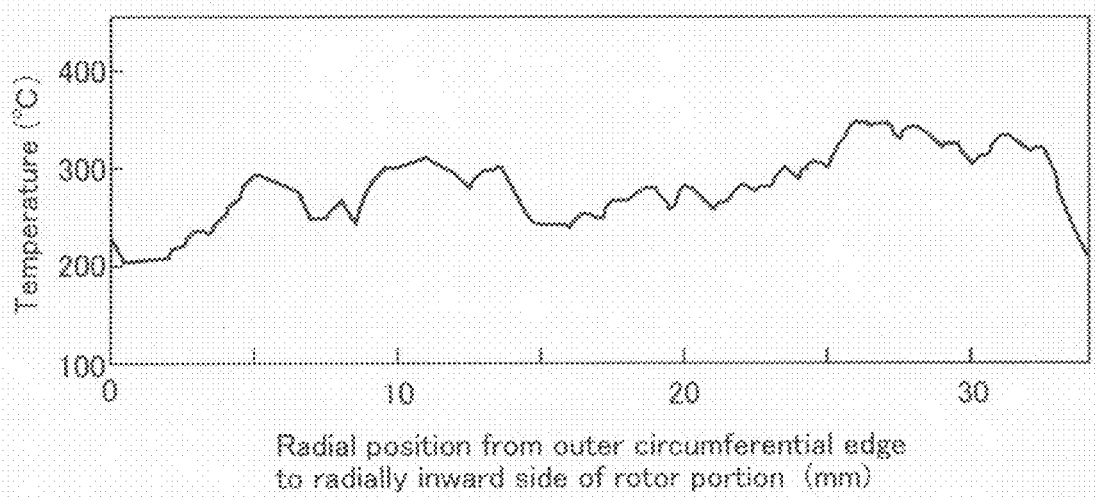

The test was carried out using a commercially available caliper and brake pads under conditions; inertial mass: 1.25 Kgf·m·S$^2$, speed of rotation: 1650 rpm, deceleration: 0.6 G, and the number of braking: one time. A picture showing the temperature distribution of the rotor portion 11 immediately after stop of the disc brake B is shown in FIG. 21(*a*) and the temperature distribution on a radial line (shown by a dotted line in FIG. 21(*a*)) passing through a portion near the cutouts 121 is shown in FIG. 21(*b*).

Example 3

In the Example 3, similarly to the Example 2, the temperature distribution in the rotor portion 11 during braking operations was measured as to the disc brake B. The braking rotor 1B was made of stainless steel however different from the Embodiment 2, no cutouts portions 131 of circular arc configuration were formed at either side of each projection 13B and no cutouts 121 were formed either in the inner circumferential portion or the outer circumferential portion of the rotor portion 11. On the contrary, the cross sectional area of each through aperture 123 formed in a projected region of the projection 13B was determined as having a same cross sectional area as each through aperture 12 formed in the rotor portion 11.

Figure 22:
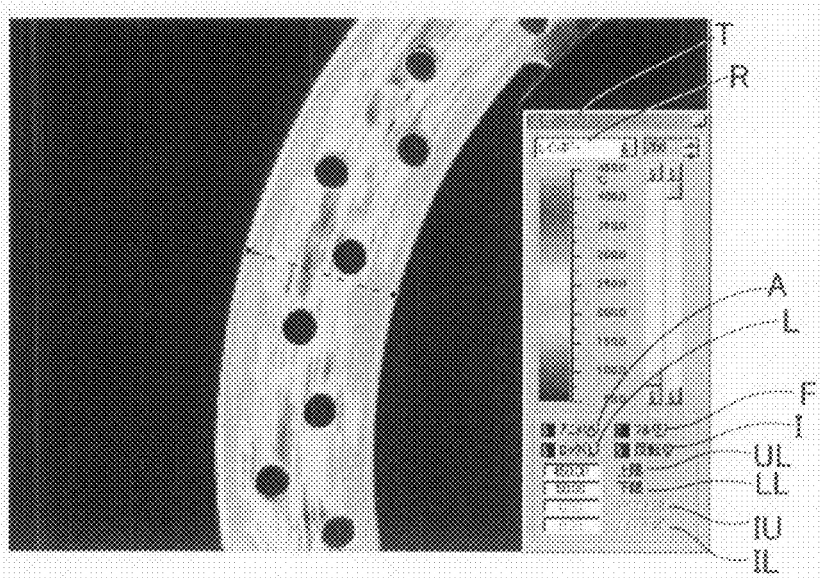
FIG. 22 (a) is a picture showing the temperature distribution of the rotor portion of the floating type disc brake of the third embodiment taken after one braking operation, and FIG. 22 (b) is a graph showing the temperature distribution along a radial direction of the rotor portion of FIG. 22 (a)
Figure 22:
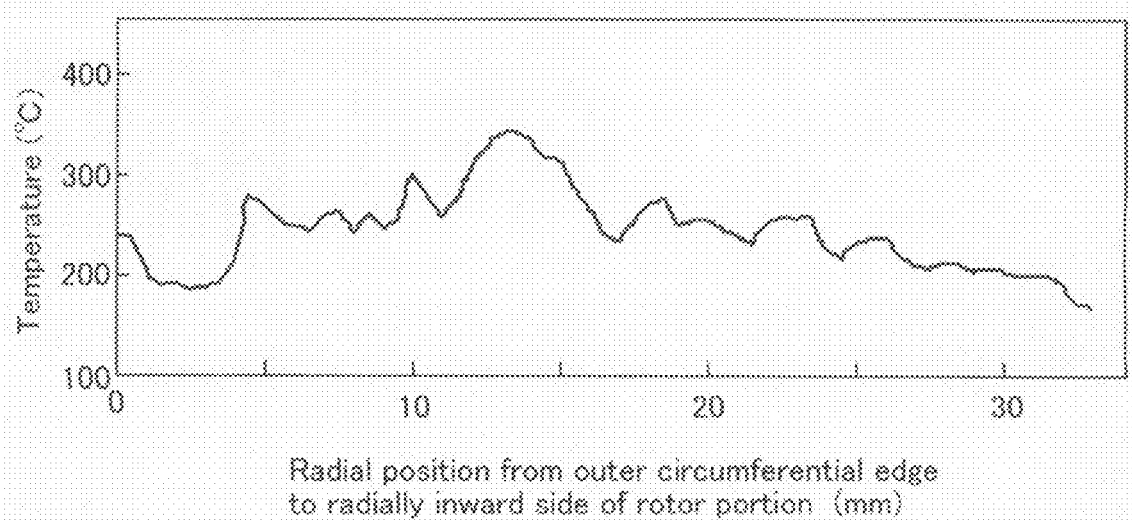

The test was carried out using a commercially available caliper and brake pads under conditions; inertial mass: 1.25 Kgf·m·S$^2$, speed of rotation: 1650 rpm, deceleration: 0.6 G, and the number of braking: one time. A picture showing the temperature distribution of the rotor portion 11 immediately after stop of the disc brake B is shown in FIG. 22(*a*) and the temperature distribution on a radial line (shown by a dotted line in FIG. 22(*a*)) passing through a portion near the cutouts 12 is shown in FIG. 22(*b*).

Comparative Example 2

In this Comparative Example 2, a conventional disc brake in which a braking rotor and a hub are connected each other using connecting pins was sued. More particularly, the conventional disc brake is structured so that the braking rotor is formed on its inner circumferential portion a plurality of connecting recesses of a first group, that the hub is formed on its outer circumferential portion a connecting recesses of a second group adapted to be abutted to the connecting recesses of the first group, and that the braking rotor and the hub are connected each other by inserting the connecting pins via belleville springs into apertures formed by abutting the connecting recesses of the first and second groups and finally by caulking the connecting pins.

The test was carried out using a commercially available caliper and brake pads under conditions; inertial mass: 1.25 Kgf·m·S$^2$, speed of rotation: 1650 rpm, deceleration: 0.6 G, and the number of braking: one time. A picture showing the temperature distribution of the rotor portion immediately after stop of the disc brake is shown in FIG. 23(*a*) and the temperature distribution on a radial line (shown by a dotted line in FIG. 23(*a*)) is shown in FIG. 23(*b*).

Figure 23:
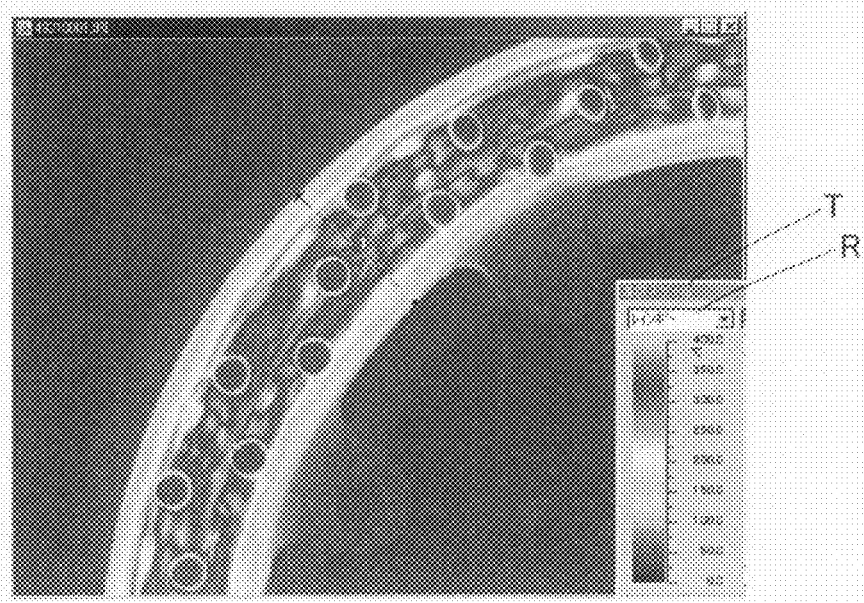
FIG. 23 (a) is a picture showing the temperature distribution of the rotor portion of the floating type disc brake of the comparative example 2 taken after one braking operation, and FIG. 23 (b) is a graph showing the temperature distribution along a radial direction of the rotor portion of FIG. 23 (a).
Figure 23:
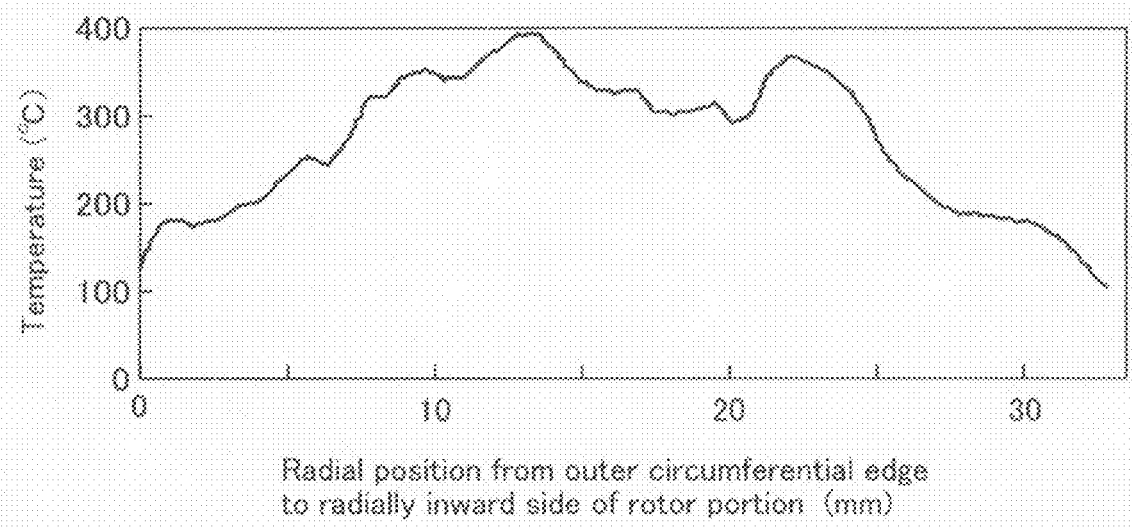

Referring to FIGS. 21~23, in the Comparative example 2, since the heat dissipation is rapidly caused at portions near the connected portions by the connecting pins on the inner circumferential portion of the rotor portion (i.e. inner circumferential portion near arms of the hub), the temperature is lowest (92° C.) at the inner circumferential portion of the rotor portion and highest (390° C.) at substantially central circumferential portion of the rotor portion. Accordingly it is found that a large difference in temperature (298° C.) is caused (see FIG. 23(*b*)) between the substantially central circumferential portion and the inner circumferential portion and thus a large temperature irregularity is caused in the surface of rotor portion (FIG. 23(*a*)).

On the contrary, in the Example 2, the temperature is lowest (202° C.) at the inner circumferential portion of the rotor portion 11 and highest (347° C.) at substantially central circumferential portion of the rotor portion 11. Accordingly it is found that a difference in temperature (144° C.) between the substantially central circumferential portion and the inner circumferential portion of the rotor portion 11 is small as compared with the Comparative Example 1 (see FIG. 21(*b*)) and thus generation of a large temperature irregularity in the surface of rotor portion is suppressed (FIG. 21(*a*)).

In the Example 3, the temperature is lowest (169° C.) at the inner circumferential portion of the rotor portion 11 and highest (347° C.) at substantially central circumferential portion of the rotor portion 11. In this case a difference in temperature (178° C.) between the substantially central circumferential portion and the inner circumferential portion of the rotor portion 11 is large as compared with the Example 1. However it is found that it is possible to reduce the difference in temperature between the substantially central circumferential portion and the inner circumferential portion of the rotor portion 11 (see FIG. 22(*b*)) only by providing the through apertures 12 in accordance with the present invention and thus generation of a large temperature irregularity in the surface of rotor portion 11 is suppressed (FIG. 22(*a*)).

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A floating type disc brake, comprising
a braking rotor and a hub arranged inside the braking rotor, the braking rotor including an annular rotor portion and a plurality of projections extending radially inward from the inner circumferential portion of the rotor portion,
a connecting means for connecting the braking rotor and the hub at positions wherein the projections of the braking rotor are abutted to the outer circumferential portion of the hub, and
cutout portions located peripherally on respective sides of each of the projections adjacent a boundary region between the rotor portion and the projections, such that a minimum width between the respective sides of each of the projections, measured at a portion at which the cutout portions are formed, is smaller than a width at a radially inner end of each of the projections,
wherein each of the respective sides of the projections includes a convex portion located radially between the radially inner end and each of the cutout portions.

2. The floating type disc brake of claim 1 wherein the cutout portions are symmetrically formed at either side of each projection.

3. The floating type disc brake of claim 1 wherein each cutout portion is formed by a curved outline to avoid stress concentration.

4. The floating type disc brake of claim 1 wherein the rotor portion is formed with an opening at the boundary region between the rotor portion and the projections and the connecting means has a center and the opening has a center and the centers lie on a common radius of the braking rotor.

5. The floating type disc brake of claim 1,
wherein the hub has straight beam-like portions connecting circumferential portions of the hub abutted to the projections of the braking rotor, and that the longitudinal center line of each beam-like portion is positioned radially inside of an imaginary line connecting between the connecting means.

6. The floating type disc brake of claim 1 wherein the connecting means includes a first plurality of pressing plates, a second plurality of pressing plates, and a plurality of leaf springs,
wherein the second plurality of pressing plates are arranged opposite to a respective one of the first plurality of pressing plates and sandwiching therewith a respective one of the plurality of projections, and the each of the first plurality of pressing plates includes a plate portion and a pair of cylindrical legs extending from the plate portion, and each of the second plurality of pressing plates includes a second plate portion, a pair of openings in the second plate portion that receive a respective one of the pair of legs, and a shallow groove that receives the leaf spring.

7. A floating type disc brake, comprising:
a braking rotor and a hub arranged inside the braking rotor, the braking rotor including an annular rotor portion and a plurality of projections extending radially inward from the inner circumferential portion of the rotor portion,
a connecting means for connecting the braking rotor and the hub at positions wherein the projections of the braking rotor are abutted to the outer circumferential portion of the hub, and
cutout portions which reduce a contacting area between the rotor portion and each projection are formed at positions radially aligned with the connecting means and facing toward the border of the projections and the rotor portion.

8. A floating type disc brake comprising;
a braking rotor and a hub arranged inside the braking rotor, the entire surface of the braking rotor in its axial direction being formed with a plurality of circular through apertures,
wherein the plurality of through apertures are distributed on a plurality of first circles having predetermined different radii concentric with the braking rotor, the distribution being made such that, on second circles, each having a predetermined radius from a center of any one of the through apertures positioned on any one of the first circles, two other through apertures positioned on another of the first circles are positioned,
wherein the second circles have the same radius relative to all the through apertures, and wherein the two other through apertures are the closest ones to the any one of the through apertures.

9. The floating type disc brake of claim 8 wherein at least one of the inner and outer circumferential portions of the braking rotor is formed with substantially semi-circular cutouts.

10. The floating type disc brake of claim 8 wherein the edge portions of the through apertures are arranged so that they are positioned at or near mutually adjacent the first circles.

11. The floating type disc brake of claim 8 wherein the braking rotor comprises an annular rotor portion and a plurality of projections spaced apart each other and extending radially inward from the inner circumferential portion of the rotor portion, wherein the outer circumferential portion of the hub is formed with cutouts corresponding to the projections of the braking rotor, and wherein constricting means for preventing axial separation between the braking rotor and the hub are arranged at regions in which the projections are fitted in the cutouts when the hub is arranged inside the braking rotor.

12. The floating type disc brake of claim 11 wherein cutout portions are symmetrically formed at both radially extending sides of each projection.

13. The floating type disc brake of claim 11 wherein the through apertures are formed in a projected region of the projections to the rotor portion at positions apart a distance larger than the thickness of the rotor portion from the boundary between the rotor portion and the projections.

14. The floating type disc brake of claim 12 wherein the through apertures of the braking rotor are arranged symmetrically with respect to a radial line passing through the center of one of projections and the center of rotation of the braking rotor.

15. The floating type disc brake of claim 5 wherein the longitudinally middle point of each beam-like portion is positioned radially outside a middle point of a radial line connecting the inner circumferential portion of the rotor portion and the outer circumferential portion of a central opening formed in the hub.

16. The floating type disc brake of claim 5 wherein the hub is formed with linear arms extending radially outward from the central opening of the hub so that they are abutted to the projections of the braking rotor.

17. The floating type disc brake of claim 11 wherein the constricting means includes a first plurality of pressing plates and a second plurality of pressing plates arranged opposite to a respective one of the first plurality of pressing plates and sandwiching therewith a respective one of the plurality of projections, wherein the each of the first plurality of pressing plates includes a plate portion and a pair of cylindrical legs extending from the plate portion, and each of the second plurality of pressing plates includes a second plate portion and a pair of openings in the second plate portion that receive a respective one of the pair of legs.

* * * * *